(12) United States Patent
Saito

(10) Patent No.: US 8,364,355 B2
(45) Date of Patent: Jan. 29, 2013

(54) DRIVING FORCE CONTROLLER AND DRIVING FORCE CONTROL METHOD OF WORKING VEHICLE

(75) Inventor: Yoshiaki Saito, Kawaguchi (JP)

(73) Assignee: Komatsu Ltd., Tokyo (JP)

( * ) Notice: Subject to any disclaimer, the term of this patent is extended or adjusted under 35 U.S.C. 154(b) by 529 days.

(21) Appl. No.: 12/601,316

(22) PCT Filed: May 28, 2008

(86) PCT No.: PCT/JP2008/059818
§ 371 (c)(1),
(2), (4) Date: Nov. 23, 2009

(87) PCT Pub. No.: WO2008/146846
PCT Pub. Date: Dec. 4, 2008

(65) Prior Publication Data
US 2010/0174454 A1    Jul. 8, 2010

(30) Foreign Application Priority Data

May 30, 2007  (JP) .................. 2007-143465

(51) Int. Cl.
*G06F 19/00* (2006.01)
(52) U.S. Cl. ............. 701/50; 701/82; 701/87; 701/90
(58) Field of Classification Search ........... 701/50, 701/82–85, 87, 90; 180/197
See application file for complete search history.

(56) References Cited

U.S. PATENT DOCUMENTS 4,762,196 A * 8/1988 Harada et al. ............. 180/197
6,330,927 B1 * 12/2001 Tokuda ...................... 180/197

FOREIGN PATENT DOCUMENTS

| JP | 4-100739 | 4/1992 |
|---|---|---|
| JP | 6-58345 | 3/1994 |
| JP | 06-220892 | 8/1994 |
| JP | 2001-115870 A1 | 4/2001 |
| JP | 2001-116129 A1 | 4/2001 |
| JP | 2001-146928 A1 | 5/2001 |
| JP | 2005-146886 A1 | 6/2005 |
| JP | 2007-49825 A1 | 2/2007 |
| JP | 2007-127174 A1 | 5/2007 |

OTHER PUBLICATIONS

International Search Report for International Application PCT/JP2008/059818 dated Jun. 16, 2008.
Refusing Reason Notice received in corresponding application No. 2009-516339 dated Aug. 14, 2012 with English translation (6 pages).

* cited by examiner

Primary Examiner — Richard M. Camby
(74) Attorney, Agent, or Firm — Kratz, Quintos & Hanson, LLP

(57) ABSTRACT

Problems of work efficiency reduction by tire slip; durability reduction by tire damage; and large tire-changing costs for users are solved by preventing repeated tire slip occurrence in situations where tire slip likely occurs such as during excavation. A working vehicle of this invention has a work equipment, and an engine power is transmitted as driving force to the tires via a driving force transmission path. Driving force variation means for freely varying the driving force transmitted to the tires is provided in the transmission path of the working vehicle. Tire slip detection means detects tire slip occurrence. When the tire slip detection means detects tire slip, driving force measurement means measures the driving force at the time of tire slip detection. Driving force control means controls the driving force variation means such that the driving force becomes smaller than that at the time of tire slip detection.

4 Claims, 16 Drawing Sheets

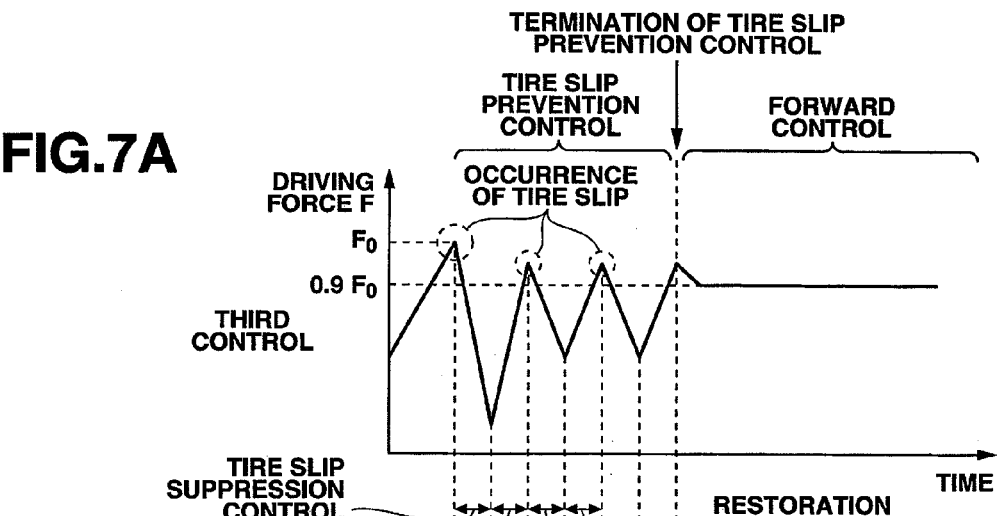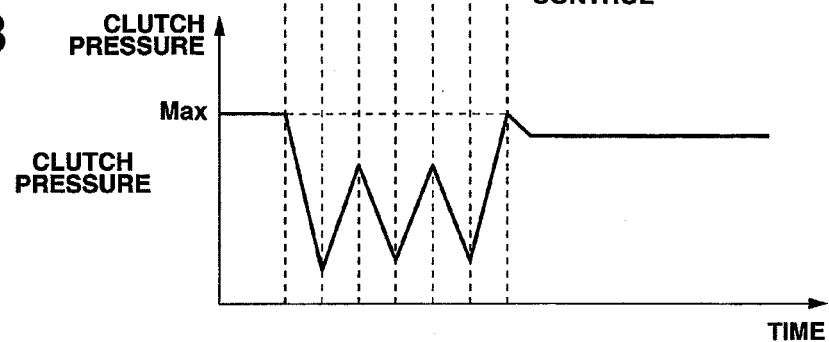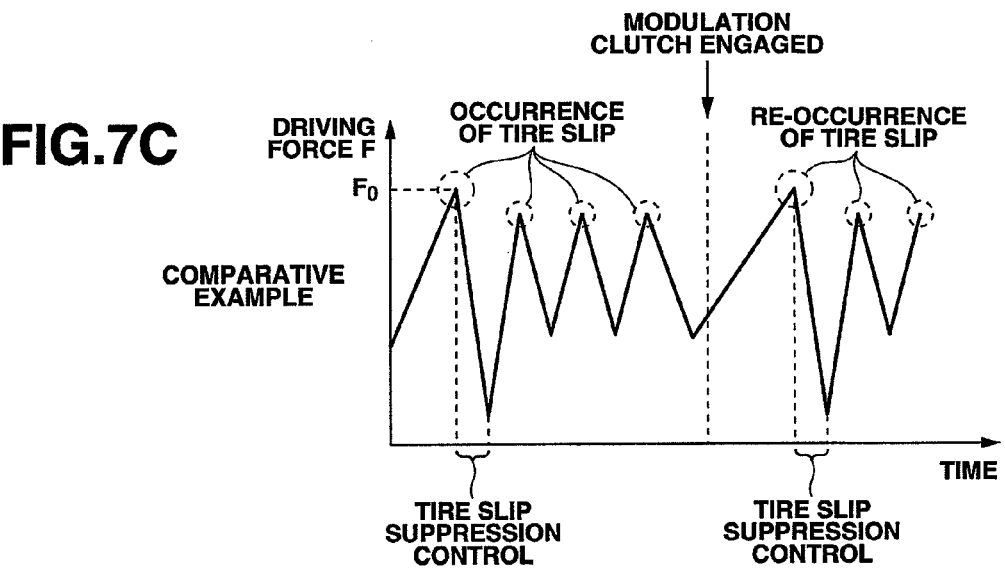

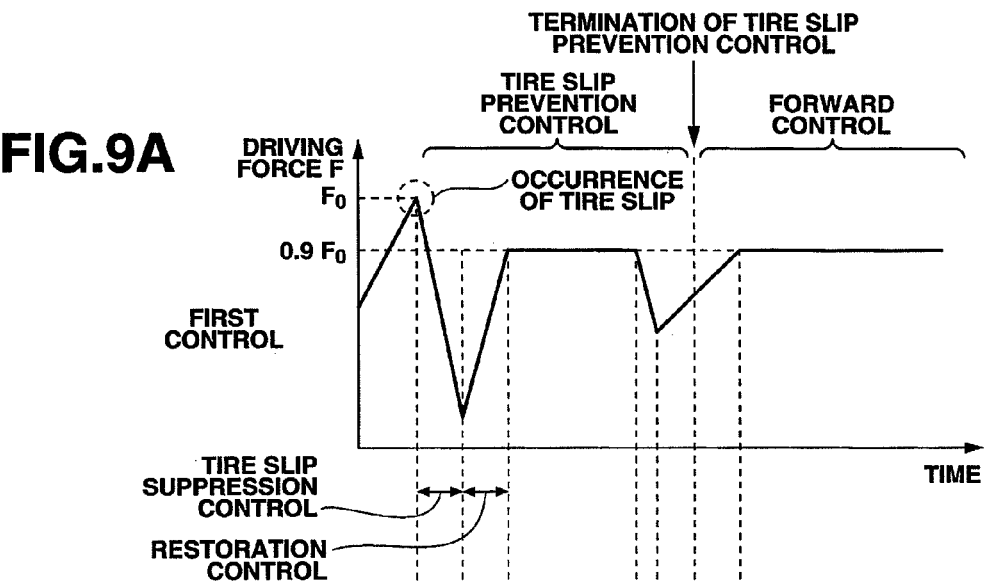
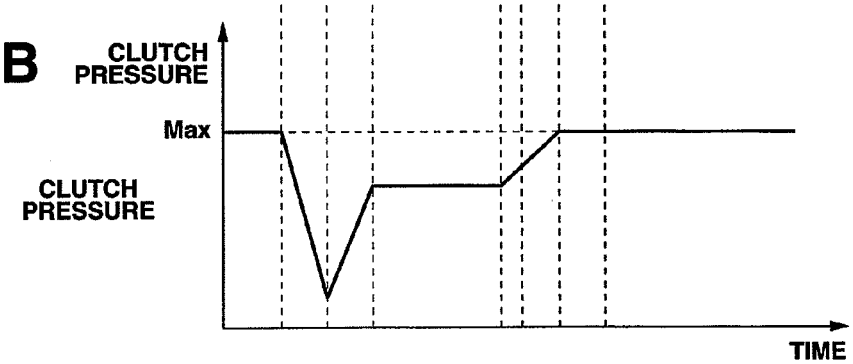
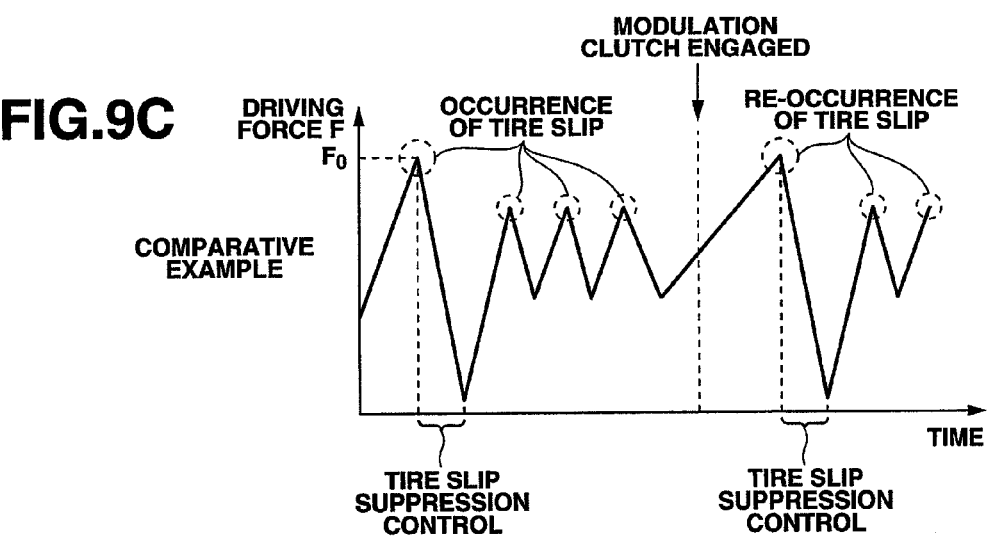

DRIVING FORCE CONTROLLER AND DRIVING FORCE CONTROL METHOD OF WORKING VEHICLE

TECHNICAL FIELD

The present invention relates to a working vehicle in which an engine power is transmitted to tires as a drive power via a driving force transmission path, and more particularly to a device and a method for controlling the driving force to prevent tire slip.

BACKGROUND ART

The driving force transmission path of a wheel loader from the engine to the tires is provided with a transfer, a modulation clutch, a torque converter, a transmission having a forward clutch, a reverse clutch and each speed clutch, and an axle.

The engine output (torque) is transmitted to the tires via the transfer, the modulation clutch, the torque converter, the transmission, and the axle.

Conventionally, in a working vehicle such as a wheel loader, the modulation clutch is provided between the engine and the torque converter, and is provided to vary the degree of engagement between an input side and an output side to vary the driving force transmitted from the engine to the torque converter. The modulation clutch is constituted as a hydraulic clutch, in which by varying hydraulic pressure (hereafter referred to as the modulation clutch pressure), the hydraulic clutch is connected (engaged) or disconnected (disengaged).

A wheel loader mainly carries out its work in a V-shaped operation. The V-shaped operation means the operation in which the wheel loader advances into a mound of soil, reverses after excavating the soil, goes forward when the wheel loader arrives at direction changing point and loads the soil into a hopper or a dump truck, and repeats this operation.

When excavating, the wheel loader forces an excavation work equipment into the mound of soil while accelerating. At this time a load on the tires is large, and a large driving force is transmitted from the engine to the tires.

Therefore, when excavating in this way, the driving force transmitted to the tires is increased, and frequently tire slip occurs between the tires and a ground surface. If the ground surface is not uniform, the load on each tire will differ, so slip will occur at one of the four tires. Further, at the time of forcing into the mound of soil, slip relative to the ground, in other words slip of both wheels, occurs very little. Tire slip occurs at only one of the left or right wheels, and the other drive wheel is static.

Tire slip not only damages work efficiency of a wheel loader, but it also causes major and serious damage to the expensive large diameter tires for working vehicles, such as cuts and perforation of the tread, and so on. Also, even if major and serious damage is not caused, progress of wear and damage to the tires is faster. Therefore, durability of the tires is reduced, and costs for changing tires are serious for users. Therefore, it is necessary to prevent tire slip.

Therefore, conventionally when operating the wheel loader, tire slip is prevented by controlling degree of engagement of the modulation clutch.

Patent Document 1 discloses an invention in which a difference in rotational speeds of left and right drive wheels of a working vehicle is calculated, and as the difference in calculated rotational speed increases, a modulation clutch pressure is decreased to weaken degree of engagement of the modulation clutch, and reduce a driving force transmitted to the tires.

Patent Document 2 discloses an invention in which slip is measured based on a difference in rotational speed of front left and right drive wheels and a difference in rotational speed of rear left and right drive wheels in a 4-wheel drive working vehicle, and if slip is detected, a hydraulic clutch of a transmission is put into a half clutch state, and a driving force transmitted to the tires is reduced.

Patent Document 3 discloses an invention in which it is determined whether excavation is being carried out by measuring a work equipment position and work equipment hydraulic pressure, and only in this case, slip control is carried out.

Patent Document 4 discloses an invention in which tire slip is calculated based on an engine rotation speed and a transmission output rotation speed, and if tire slip is detected, an engine output characteristic is switched to a low torque characteristic, to reduce a driving force transmitted to the tires.

Patent Document 1: Japanese Patent Application Laid-open No. 2001-146928
Patent Document 2: Japanese Patent Application Laid-open No. 6-58345
Patent Document 3: Japanese Patent Application Laid-open No. 2005-146886
Patent Document 4: Japanese Patent Application Laid-open No. 2001-115870

The inventions according to Patent Documents 1, 2, 4 each infer whether tire slip has occurred from the rotational speed state of parts on the transmission path from the engine to the tires (drive wheels) or the vehicle speed, and when it is inferred that tire slip has occurred, control is carried out so as to reduce the tire slip, such as by decreasing the modulation clutch pressure, or changing the engine characteristics. Therefore, when it is inferred that tire slip is not occurring, the control to reduce the tire slip is canceled, and control is carried out to increase the modulation clutch pressure to restore the normal modulation clutch pressure state, or to restore the characteristics to the normal engine characteristics.

However, tire slip is a phenomenon in which the driving force transmitted to the tires exceeds an adhesion limit between the tires and the ground surface, in other words exceeds the maximum static friction force, so the tires rotate without the vehicle moving. Also, once the tires start slipping, the tires receive friction from the ground surface with dynamic friction force, which is lower than the adhesion limit. As a result, the reactive force from the ground surface is dramatically reduced and whereby the minimum driving force that requires to cause the tire slip is reduced.

In this way there is hysteresis in the driving force causing tire slip, so if the inventions according to Patent Documents 1, 2, 4 are applied as they are, tire slip will occur again due to the process of carrying out the control to restore the modulation clutch pressure or the like to the normal state, even though tire slip will be temporarily stopped by the control to suppress the tire slip. Subsequently hunting occurs in which the tire slip suppression state (tire non-slip state) and the tire slip state are repeated alternately.

In other words, taking the invention according to Patent Document 1 as an example, when it is inferred that tire slip has occurred, the tire slip is temporarily suppressed by decreasing the modulation clutch pressure to weaken the degree of engagement of the modulation clutch to reduce the driving force transmitted to the tires. Although the tire slip is temporarily suppressed, after suppression of the tire slip the modulation clutch pressure is gradually increased in accordance with the difference in rotational speed of the left and right drive wheels only, without consideration of the driving force transmitted to the tires or the dynamic friction force. Therefore, tire slip occurs again while increasing the modulation clutch pressure. Thereafter the tire slip suppression by decreasing the modulation clutch pressure and occurrence of tire slip by increasing the modulation clutch pressure are repeated alternately.

Therefore in the conventional technique, although tire slip is temporarily suppressed, tire slip repeatedly occurs throughout the whole period that excavation is being carried out. This is an equivalent to having tire slip occurring continuously during excavation operation.

Therefore, the problem of reduction of work efficiency due to tire slip, and the problem of reduction in durability due to tire damage and the large cost for the user of changing the tires cannot be solved with the conventional technique.

Also, the invention according to Patent Document 3 discloses a technique for determining whether slip has occurred in the case where it is judged that excavation operation is being carried out. However, this does not mention slip control specifically.

With the foregoing in view, the present invention solves the problem of reduction of work efficiency due to tire slip and the problems of reduction in durability due to tire damage and the large cost for the user of changing the tires, due to repeated occurrence of tire slip in situations where there is the possibility of occurrence of tire slip, such as during excavation and the like.

DISCLOSURE OF THE INVENTION

The first aspect of the present invention provides a driving force control device of a working vehicle in which a work equipment is provided, and a power of an engine is transmitted to a tire as a driving force via a driving force transmission path, the device comprising:

driving force variation means for freely varying the driving force transmitted to the tire, the driving force variation means being provided in the driving force transmission path;

tire slip detection means for detecting an occurrence of a tire slip;

driving force measurement means for measuring the driving force; and driving force control means for controlling the driving force variation means such that the driving force becomes smaller than the driving force at the time of the detection of the tire slip.

The second aspect of the present invention provides a driving force control device of a working vehicle in which a work equipment is provided, and a power of an engine is transmitted to a tire as a driving force via a driving force transmission path, the device comprising:

driving force variation means for freely varying the driving force transmitted to the tire, the driving force variation means being provided in the driving force transmission path;

tire slip detection means for detecting an occurrence of a tire slip;

driving force measurement means for measuring the driving force; and first tire slip prevention control means for controlling the driving force variation means such that, when the tire slip detection means detects the tire slip, the driving force is reduced to suppress the tire slip, and after the tire slip is suppressed, the driving force is restored within a range that is smaller than the driving force at the time of the detection of the tire slip.

The third aspect of the present invention provides a driving force control device of a working vehicle in which a work equipment is provided, and a power of an engine is transmitted to a tire as a driving force via a driving force transmission path, the device comprising:

driving force variation means for freely varying the driving force transmitted to the tire, the driving force variation means being provided in the driving force transmission path;

tire slip detection means for detecting an occurrence of a tire slip;

driving force measurement means for measuring the driving force;

second tire slip prevention control means for controlling the driving force variation means such that, when the tire slip detection means detects the tire slip, the driving force is reduced to suppress the tire slip, and after the tire slip is suppressed, the driving force is restored; and forward control means for controlling the driving force variation means such that, after termination of the second tire slip prevention control, the driving force becomes smaller than the driving force at the time of the detection of the tire slip.

The fourth aspect of the present invention provides a driving force control device of a working vehicle in which a work equipment is provided, and a power of an engine is transmitted to a tire as a driving force via a driving force transmission path, the device comprising:

driving force variation means for freely varying the driving force transmitted to the tire, the driving force variation means being provided in the driving force transmission path;

tire slip detection means for detecting an occurrence of a tire slip;

driving force measurement means for measuring the driving force;

first tire slip prevention control means for controlling the driving force variation means such that, when the tire slip detection means detects the tire slip, the driving force is reduced to suppress the tire slip, and after the tire slip is suppressed, the driving force is restored within a range that is smaller than the driving force detected at the time of the tire slip; and forward control means for controlling the driving force variation means such that, after termination of the first tire slip prevention control, the driving force becomes smaller than the driving force at the time of the detection of the tire slip.

The fifth aspect of the present invention provides the driving force controller of a working vehicle according to the first aspect, the second aspect, the third aspect, or the fourth aspect of the present invention, wherein the driving force variation means is a modulation clutch that can freely vary a degree of engagement of an input side and an output side, and the driving force control means or the first tire slip prevention control means or the forward control means controls the degree of engagement of the modulation clutch such that the driving force becomes smaller than the driving force at the time of the detection of the tire slip.

The sixth aspect of the present invention provides the driving force controller of a working vehicle according to the first aspect, the second aspect, the third aspect, or the fourth aspect of the present invention, wherein the driving force transmission path is provided with a hydrostatic transmission (HST) including a hydraulic pump connected to an output shaft of the engine, a hydraulic motor connected to the tire, and a closed circuit that links the hydraulic pump and the hydraulic motor, the driving force variation means is capacity variation means for freely varying a capacity of the hydraulic pump and/or the hydraulic motor of the hydrostatic transmission, and the driving force control means, the first tire slip prevention control means, or the forward control means controls the capacity variation means such that the driving force becomes smaller than the driving force at the time of the detection of the tire slip.

The seventh aspect of the present invention provides the driving force controller of a working vehicle according to the third aspect or the fourth aspect of the present invention, wherein when the tire slip detection means detects the tire slip during control by the forward control means, the control by the forward control means is suspended, and control is transferred to one by the first or the second tire slip prevention control means.

The eighth aspect of the present invention provides the driving force controller of a working vehicle according to the third aspect or the fourth aspect of the present invention, wherein the control by the forward control means is terminated when the work equipment is operated in a specific direction or when a direction of travel of the working vehicle is operated into an opposite direction.

The ninth aspect of the present invention provides the driving force controller of a working vehicle according to the first aspect, the second aspect, the third aspect, or the fourth aspect of the present invention, wherein the work equipment is a work equipment for excavation, and the control by the driving force control means, the control by the first or second tire slip prevention control means, or the control by the forward control means is carried out during excavation operations.

The tenth aspect of the present invention provides a driving force control method for a working vehicle which has a work equipment for excavation and carries out excavation operation by transmitting a driving force to a tire, the method being carried out during excavation operations, and comprising:

a step of detecting a tire slip;

a step of measuring the driving force; and a step of controlling the driving force such that the driving force becomes smaller than the driving force at the time of the detection of the tire slip.

As shown in FIG. 1, the first aspect of the present invention is applied to a working vehicle 1 having a work equipment 2, and the driving force of an engine 10 is transmitted as driving force to tires 30 via a driving force transmission path 20.

The driving force transmission path 20 of the working vehicle 1 is provided with driving force variation means 40 for freely varying the driving force F transmitted to the tires 30.

The occurrence of tire slip is detected by tire slip detection means 50.

When the occurrence of tire slip is detected by the tire slip detection means 50, the driving force F0 detected at the time of tire slip is measured by driving force measurement means 60.

Driving force control means 70 controls the driving force variation means 40, so that the driving force is less than the driving force F0 detected at the time of tire slip.

The driving force control carried out by the driving force control means 70 is carried out by a process procedure that is shown as an example in FIG. 11.

The operation and effect of the first aspect of the present invention are explained using FIGS. 2 and 3.

FIG. 2A shows an example of the variation of the driving force with time using the first aspect of the present invention, during operation, FIG. 2B shows an example of the variation of the clutch pressure with time for the case that the driving force variation means 40 is the modulation clutch 40, and FIG. 2C shows an example of the variation of the driving force with time using the conventional technique during operation, as a comparative example.

FIG. 3A shows an example of the variation of the rotational speed of the left and right tires using the first aspect of the present invention during operation, and FIG. 3B shows an example of the variation of the rotational speed of the left and right tires using the conventional technique during operation, as a comparative example.

In the case of the present invention, when the occurrence of tire slip is detected, the driving force variation means 40 is controlled such that the driving force F is less than the driving force F0 detected at the time of tire slip. As a result the driving force F is controlled to be less than the driving force F0 (FIG. 2A). Therefore although tire slip occurs once, subsequently it is possible to prevent the occurrence of tire slip throughout the whole period of operation (FIG. 3A).

In contrast, in the case of conventional technique (Patent Document 1), when the occurrence of tire slip is detected, the modulation clutch pressure is decreased, the degree of engagement of the modulation clutch is weakened, and the driving force transmitted to the tires is reduced, so tire slip is temporarily suppressed. Although the tire slip is temporarily suppressed, after suppressing the tire slip, the modulation clutch pressure is gradually increased in accordance with the difference in rotational speed of the left and right drive wheels only, without taking into consideration the driving force transmitted to the tires or the dynamic frictional force. As a result tire slip occurs again while the modulation clutch pressure is being increased. Subsequently suppression of the tire slip due to decreasing the modulation clutch pressure, and occurrence of tire slip due to increasing the modulation clutch pressure are alternately repeated (FIG. 2C).

Therefore in the conventional technique, although tire slip is temporarily suppressed, tire slip repeatedly occurs throughout the whole period that excavation is being carried out (FIG. 3B).

In this way, according to the first aspect of the present invention, it is possible to prevent the repeated occurrence of tire slip during excavation and other situations where tire slip can easily occur. Therefore the present invention solves the problem of reduction of work efficiency due to tire slip and the problems of reduction in durability due to tire damage and the large cost for the user of changing the tires.

As shown in FIG. 1, the second aspect of the present invention is applied to the working vehicle 1 having the work equipment 2, and the driving force of the engine 10 is transmitted as driving force to the tires 30 via the driving force transmission path 20, as is the case with the first aspect of the present invention.

The driving force variation means 40, the tire slip detection means 50, and the driving force measurement means 60 are provided, as is the case with the first aspect of the present invention.

As shown in FIG. 12A, when tire slip is detected by the tire slip detection means 50, first tire slip prevention control means 71a controls the driving force variation means 40 to reduce the driving force to suppress the tire slip, and after the tire slip is suppressed, restores the driving force F within a range less than the driving force F0 detected at the time of tire slip.

The first tire slip prevention control carried out by the first tire slip prevention control means 71a is carried out by a process procedure that is shown as an example in FIG. 4.

The operation and effect of the second aspect of the present invention is explained using FIG. 2C, FIG. 3, and FIG. 5.

FIG. 5A shows an example of the variation of the driving force with time using the second aspect of the present invention during operation, FIG. 5B shows an example of the variation of the clutch pressure with time for the case that the driving force variation means 40 is the modulation clutch 40, and FIG. 2C shows an example of the variation of the driving force with time using the conventional technique during operation, as a comparative example.

FIG. 3A shows an example of the variation of the rotational speed of the left and right tires using the second aspect of the present invention during operation, and FIG. 3B shows an example of the variation of the rotational speed of the left and right tires using the conventional technique during operation, as a comparative example.

In the case of the present invention, when the occurrence of the tire slip is detected, the driving force is reduced so that the tire slip is suppressed. Then, after the tire slip has been suppressed, the driving force F is restored within a range that is less than the driving force F0 detected at the time of tire slip (FIG. 5). As a result even though tire slip occurs once, subsequently as long as the first tire slip prevention control is being carried out, it is possible to prevent the occurrence of tire slip (FIG. 3A).

In contrast, in the case of the conventional technique (Patent Document 1), when the occurrence of tire slip is detected, the modulation clutch pressure is decreased, the degree of engagement of the modulation clutch is weakened, and the driving force transmitted to the tires is reduced, so tire slip is temporarily suppressed. Although the tire slip is temporarily suppressed, after suppressing the tire slip, when the modulation clutch pressure is restored to the original state, the modulation clutch pressure is gradually increased in accordance with the difference in rotational speed of the left and right drive wheels only, without taking into consideration the driving force transmitted to the tires or the dynamic frictional force. As a result tire slip occurs again while the modulation clutch pressure is being increased. Subsequently suppression of the tire slip due to decreasing the modulation clutch pressure, and occurrence of tire slip due to increasing the modulation clutch pressure are alternately repeated (FIG. 2C).

Therefore in the conventional technique, although tire slip is temporarily suppressed, tire slip repeatedly occurs during the time that the modulation clutch pressure is being restored (FIG. 3B).

In this way, according to the second aspect of the present invention, it is possible to prevent the repeated occurrence of tire slip while the first tire slip prevention control is being carried out. Therefore the present invention solves the problem of reduction of work efficiency due to tire slip and the problems of reduction in durability due to tire damage and the large cost for the user of changing the tires.

Further, in the case that the driving force is set in advance by the operator, it is not possible to vary it flexibly in response to changes in the ground conditions or the like. In contrast, in the present invention it is possible to transmit the appropriate driving force in response to changing ground surface conditions or the like.

As shown in FIG. 1, the third aspect of the present invention is applied to the working vehicle 1 having the work equipment 2, and the driving force of the engine 10 is transmitted as driving force to the tires 30 via the driving force transmission path 20, as is the case with the first aspect of the present invention.

The driving force variation means 40, the tire slip detection means 50, and the driving force measurement means 60 are provided, as is the case with the first aspect of the present invention.

When tire slip is detected by the tire slip detection means 50, second tire slip prevention control means 71b shown in FIG. 12B controls the driving force variation means 40 to reduce the driving force to suppress the tire slip, and after the tire slip is suppressed, restores the driving force F. This control is referred to as the second slip prevention control.

The second tire slip prevention control carried out by the second tire slip prevention control means 71b is carried out in accordance with the process procedure that is shown as an example in FIG. 6A. Unlike that of FIG. 4, control to restore the driving force F within a range that is less than the driving force F0 detected at the time of tire slip is not carried out.

When the second tire slip prevention control is terminated, forward control means 72 controls the driving force variation means 40 so that the driving force is within a range that is less than the driving force F0 detected at the time of tire slip.

The forward control by the forward control means 72 is carried out in accordance with the process procedure that is shown as an example in FIG. 6B.

The operation and effect of the third aspect of the present invention is explained using FIG. 7.

FIG. 7A shows an example of the variation of the driving force with time using the third aspect of the present invention during operation, FIG. 7B shows an example of the variation of the clutch pressure with time for the case that the driving force variation means 40 is the modulation clutch 40, and FIG. 7C shows an example of the variation of the driving force with time using conventional technique during operation, as a comparative example.

In the case of the present invention, when the occurrence of tire slip is detected, the second tire slip prevention control is started, and the driving force is reduced so that the tire slip is suppressed. Here, in order to positively suppress the tire slip, the modulation clutch pressure is forcibly and suddenly decreased to a very low value, and the driving force F is suddenly reduced. Therefore, the operator on the working vehicle 1 feels that something is different and a shock is applied to the operator and a vehicle body. Then after the tire slip has been suppressed, the modulation clutch pressure is increased and the driving force F is restored, and the second tire slip prevention control is terminated. The second tire slip prevention control is terminated when, for example, the modulation clutch pressure is increased to the complete engagement pressure (FIGS. 7A, 7B).

After the second tire slip prevention control is terminated, the forward control is started. When the forward control is started, thereafter the driving force variation means 40 is controlled so that the driving force is less than the driving force F0 detected at the time of tire slip. Here, it is assumed that the operator again attempts to increase the driving force F by pressing the accelerator pedal or the like. However, after the start of forward control, the driving force F is suppressed to be less than the driving force F0 detected at the time of tire slip, so the driving force does not reach the driving force that causes tire slip, and it is possible to prevent the occurrence of tire slip. Therefore, subsequently it is possible to avoid transferring again to the tire slip prevention control due to the detection of tire slip. Therefore, it is possible to avoid restarting the tire slip prevention control, carrying out the control to suppress the tire slip, and preventing the large drop in the driving force F due to the tire slip suppression control as described above. As a result, the operator does not feel that something is different and a shock is not applied to the operator and the vehicle body.

In contrast, in the case of the conventional technique (Patent Document 1), when the occurrence of tire slip is detected, the tire slip prevention control is started, and the driving force is reduced to suppress the tire slip. Here, in order to positively suppress the tire slip, the modulation clutch pressure is forcibly and suddenly decreased to a very low value so that the driving force F is suddenly reduced. Therefore, the operator on the working vehicle 1 feels that something is different and a shock is applied to the operator and the vehicle body. Also, after the tire slip has been suppressed, the modulation clutch pressure is increased and the driving force F is restored, and the tire slip suppression control is terminated. The tire slip prevention control is terminated when, for example, the modulation clutch pressure is increased to the complete engagement pressure (FIG. 7C).

After termination of the tire slip prevention control, unlike in the present invention, the forward control is not executed. Therefore, when the operator again attempts to increase the driving force F by pressing the accelerator pedal or the like, the driving force F exceeds the limit for causing tire slip, so tire slip occurs again. Therefore, subsequently the tire slip prevention control is again started when the tire slip is detected, the tire slip suppression control is executed as described above, and as a result the driving force F is greatly reduced. As a result, again the operator feels that something is different, and a shock is applied to the operator and to the vehicle body.

In this way, according to the third aspect of the present invention, the forward control is carried out, so at least while the forward control is being executed tire slip is positively suppressed.

Moreover, by executing the forward control, it is possible to prevent transferring again to the tire slip prevention control. Therefore, it is possible to avoid giving the operator the feeling that something is different and applying a shock to the operator and the vehicle body as a result of again carrying out the tire slip prevention control.

Further, in the case that the driving force is set in advance by the operator, it is not possible to vary it flexibly in response to changes in the ground conditions or the like. In contrast, in the present invention it is possible to transmit the appropriate driving force in response to changing ground surface conditions or the like.

The fourth aspect of the present invention is a combination of the constitution of the second aspect of the present invention and the constitution of the third aspect of the present invention, when tire slip is detected by the tire slip detection means 50, the first tire slip prevention control means 71a shown in FIG. 12B controls the driving force variation means 40 to reduce the driving force to suppress the tire slip, and after the tire slip is suppressed, restores the driving force F within a range less than the driving force F0 detected at the time of tire slip.

The tire slip prevention control carried out by the first tire slip prevention control means 71a is carried out by a process procedure that is shown as an example in FIG. 8A.

When the first tire slip prevention control is terminated, the forward control means 72 controls the driving force variation means 40 so that the driving force is less than the driving force F0 detected at the time of tire slip.

The forward control by the forward control means 72 is carried out by a process procedure that is shown as an example in FIG. 8B.

The operation and effect of the fourth aspect of the present invention is explained using FIG. 3 and FIG. 9.

FIG. 9A shows an example of the variation of the driving force with time using the third aspect of the present invention during operation, FIG. 9B shows an example of the variation of the clutch pressure with time for the case that the driving force variation means 40 is the modulation clutch 40, and FIG. 9C shows an example of the variation of the driving force with time using conventional technique during operation, as a comparative example.

In this way, according to the fourth aspect of the present invention, similar to the second aspect of the present invention, while the first tire slip prevention control is being carried out, it is possible ensure that tire slip does not repeatedly occur (FIG. 3A). Therefore the present invention solves the problem of reduction of work efficiency due to tire slip and the problems of reduction in durability due to tire damage and the large cost for the user of changing the tires.

Also, according to the fourth aspect of the present invention, similar to the third aspect of the present invention, the forward control is carried out, so tire slip is also positively suppressed during the period after the first tire slip prevention control is terminated (FIGS. 9A, 9B).

Moreover, by carrying out the forward control, it is possible to prevent transferring again to the tire slip prevention control. Therefore, it is possible to avoid giving the operator the feeling that something is different and applying a shock to the operator and the vehicle body as a result of again carrying out the tire slip prevention control.

Further, in the case that the driving force is set in advance by the operator, it is not possible to vary it flexibly in response to changes in the ground conditions or the like. In contrast, in the present invention it is possible to transmit the appropriate driving force in response to changing ground surface conditions or the like.

In the fifth aspect of the present invention, as shown in FIG. 1, the driving force variation means 40 is constituted by a modulation clutch, and for example if the modulation clutch is a hydraulic clutch, by varying the degree of engagement of the input side and the output side by adjusting the modulation clutch pressure, the driving force F transmitted to the tires 30 is varied.

The driving force control means 70, or the first or second tire slip prevention control means 71a or 71b, or the forward control means 72 of the first aspect of the present invention, the second aspect of the present invention, the third aspect of the present invention, or the fourth aspect of the present invention, control the degree of engagement of the modulation clutch 40 by for example adjusting the modulation clutch pressure, so that the driving force is less than the driving force F0 detected at the time of tire slip.

In the sixth aspect of the present invention, a hydrostatic transmission (HST) 80 is provided in the driving force transmission path 20, as shown in FIG. 10. The hydrostatic transmission 80 is constituted to include a hydraulic pump 81 that is connected to the output shaft 21 of the engine 10, a hydraulic motor 82 connected to the tires 30, and a closed circuit 83 connected to the hydraulic pump 81 and the hydraulic motor 82.

Capacity variation means constitutes the driving force variation means 40, and by adjusting for example swash plates in the hydraulic pump 81 and/or the hydraulic motor 82 of the hydrostatic transmission 80 to vary the capacity, the driving force F transmitted to the tires 30 is varied.

The driving force control means 70, or the first or second tire slip prevention control means 71a or 71b, or the forward control means 72 of the first aspect of the present invention, the second aspect of the present invention, the third aspect of the present invention, or the fourth aspect of the present invention, control the capacity of the hydraulic pump 81 and/or the hydraulic motor 82 by adjusting for example the swash plates, so that the driving force is less than the driving force F0 detected at the time of tire slip.

While the forward control as described above is being executed by the forward control means 72 of the third aspect of the present invention or the fourth aspect of the present invention, tire slip can occur due to changes in the ground surface state or the like. In this case, the limiting driving force to cause tire slip has been reduced, so it is desirable to again transfer to the first tire slip prevention control to properly suppress the tire slip, and update the driving force F0 detected at the time of tire slip.

Therefore, in the seventh aspect of the present invention, when the control is being executed by the forward control means 72, when tire slip is detected by the tire slip detection means 50, the control by the forward control means 72 is suspended to give priority to the tire slip prevention control, and control is transferred to the tire slip prevention control means 71. As a result, the tire slip prevention control is carried out based on the updated driving force F0 detected at the time of tire slip, so the tire slip is positively suppressed. When the tire slip prevention control is finished and the forward control is re-started, the driving force is limited to less than the updated driving force F0 detected at the time of tire slip, and the tire slip is suppressed. In this way, according to the present invention, it is possible to respond flexibly to changes in the ground surface and the like.

Assuming that during excavation operations, when the work equipment 2 which is a boom 2a is operated in the upwards direction or a bucket 2b is operated in the tilt direction, the vertical resistance force of the ground surface against the tires 30 increases, so that the friction between the tires 30 and the ground surface increases, and tire slip becomes more difficult to occur. Therefore, in this kind of situation there is no necessity to deal with tire slip by limiting the driving force, and on the contrary it is desirable to terminate the forward control and cancel the limitation on the driving force, in order to increase the operability of the work equipment.

Also, the operator indicates his intention to temporarily terminate the excavation operation by operating the work equipment 2 in a specific direction. Also, changing the traveling direction of the working vehicle 1 to the opposite direction means that the work equipment 2 is far from the mound of soil or the like. This means that one excavation cycle has finished. When one excavation cycle finishes, tire slip is more difficult to occur. Also, the ground surface condition will change from the current excavation to the next excavation cycle. Therefore, in these circumstances it is not necessary to deal with tire slip by limiting the driving force, and on the contrary it is desirable to terminate the forward control and cancel the limitation of the driving force in preparation for the start of the next excavation cycle.

Therefore, in the eighth aspect of the present invention, while the forward control is being executed by the forward control means 72 in the third aspect of the present invention or the fourth aspect of the present invention, if the work equipment 2 is operated in a specific direction, or if the working vehicle 1 is operated to reverse the direction of travel, the control by the forward control means 72 is terminated.

According to the eighth aspect of the present invention, it is possible to cancel the state in which there is unnecessary limitation on the driving force, and prepare for the start of the next excavation cycle.

The working vehicle 1 such as a wheel loader or the like, equipped with the work equipment 2 for excavation, for example the work equipment 2 that includes the boom 2a and the bucket 2b, carries out excavation operation using the work equipment 2. As stated previously, during excavation operations the driving force transmitted to the tires 30 increases, so tire slip can easily occur. In the ninth aspect of the present invention, the control by the driving force control means 70, or the tire slip prevention control by the first or second tire slip prevention control means 71a or 71b, or the forward control by the forward control means 72 in the first aspect of the present invention, the second aspect of the present invention, the third aspect of the present invention, or the fourth aspect of the present invention are executed during excavation operations. Therefore it is possible to avoid the repeated occurrence of tire slip during excavation operations.

In the tenth aspect of the present invention, during excavation operations, the driving force F is controlled to be less than the driving force F0 detected at the time of tire slip, similar to the first aspect of the present invention.

According to the tenth aspect of the present invention, the driving force F is controlled to be less than the driving force F0 at the time that tire slip was detected, so it is possible to avoid the repeated occurrence of tire slip during excavation operations.

BEST MODE FOR CARRYING OUT THE INVENTION

The following is an explanation of the embodiments of the present invention with reference to the drawings.

The following is an explanation of each type of control, in other words the first control, the second control, the third control, and the fourth control, that are carried out in a first vehicle constitution example.

The best mode for carrying out the present invention is a combination of the first vehicle constitution example and the first control, which is explained later. In the following, the first control, the second control, the third control, and the fourth control are explained in that order for the first vehicle constitution example.

Also, as explained later, it is also possible to implement a combination of a second vehicle constitution example in combination with each of the controls.

(First Vehicle Constitution Example)

FIG. 1A is a block diagram showing the constitution of an embodiment of a working vehicle, indicating the parts according to the present invention for the constitution of a wheel loader.

FIG. 1B is a diagram showing the external appearance of the working vehicle, indicating the parts according to the present invention in the external appearance of the wheel loader.

As shown in FIG. 1B, a work equipment 2 for excavation operation is provided in the front of a vehicle body 1a of a working vehicle 1. The work equipment 2 includes a boom 2a rotatably connected to the vehicle body 1a, and a bucket 2b rotatably connected to the boom 2a. An operating lever 4 for the work equipment is provided at a driver's seat of the working vehicle 1. The boom 2a moves in the boom upward direction or in the boom downward direction in accordance with the operation of the operating lever 4 for the work equipment. Also, the bucket 2b moves in the excavation direction or in the tilt direction in accordance with the operation of the operating lever 4 for the work equipment.

As shown in FIG. 1A, the driving power of an engine 10 is transmitted to tires 30 as driving force via a traveling driving force transmission path 20. Also, the driving power of the engine 10 is transmitted to the work equipment 2 via a work equipment driving force transmission path 90. The left tire is indicated as 30L, and the right tire is indicated as 30R.

The traveling driving force transmission path 20 of the working vehicle 1 is provided with a modulation clutch 40 as driving force variation means for freely varying the driving force F transmitted to the tires 30.

A controller 3 includes tire slip detection means 50, driving force measurement means 60, and driving force control means 70.

The traveling driving force transmission path 20 includes an output shaft 21 of the engine 10, a transfer 22, the modulation clutch 40, a torque converter 23, a transmission 24, and an axle 25.

On the other hand, the work equipment driving force transmission path 90 includes the output shaft 21 of the engine 10, the transfer 22, and a hydraulic circuit 91. The hydraulic circuit 91 includes a hydraulic pump as source of hydraulic pressure driving power, a directional flow rate control valve for switching the direction and the flow rate of the hydraulic oil output from the hydraulic pump, and a hydraulic cylinder as hydraulic actuator that is actuated by being supplied with hydraulic oil that has passed through the directional flow rate control valve. The hydraulic cylinder is mechanically connected to the work equipment 2, namely, the boom 2a and the bucket 2b.

In other words, the output shaft 21 of the engine 10 is connected to the transfer 22. The transfer 22 is connected to an input shaft 40a of the modulation clutch 40, and is also connected to the hydraulic pump, which is not shown on the drawings, in the hydraulic circuit 91.

An output shaft 40b of the modulation clutch 40 is connected to the torque converter 23. The modulation clutch 40 is provided to vary the driving force transmitted from the engine 10 to the torque converter 23 via the transfer 22, by varying the degree of engagement of the input shaft 40a side and the output shaft 40b side. The modulation clutch 40 is constituted by, for example, a wet-type multi-plate hydraulic clutch.

The frictional engagement force of the input side and output side of the modulation clutch 40 is controlled by varying the magnitude of the pressure of the discharged hydraulic oil supplied to the modulation clutch 40. In this way the modulation clutch 40 has either a connected operation (engaged operation) or disconnected operation (disengaged operation). The modulation clutch 40 is controlled by the driving force control means 70 of the controller 3. In the driving force control means 70 of the controller 3 a target electrical current is generated and an electrical current instruction is output corresponding to the target electrical current, in order to make the modulation clutch pressure equal to the desired magnitude. As a result, the modulation clutch pressure is varied in accordance with the electrical current instruction, and the driving force F is varied.

The output shaft of the torque converter 23 is connected to an input shaft of the transmission 24. The transmission 24 includes a forward clutch that corresponds to forward traveling means, a rear clutch that corresponds to rear traveling means, and speed step clutches corresponding to each speed step, in other words for example a first speed clutch, a second speed clutch, and a third speed clutch corresponding to the first speed step, the second speed step, and the third speed step, respectively. Each clutch is constituted by, for example, wet-type multi-plate hydraulic clutches.

The frictional engagement force of an input side and an output side of each clutch is controlled by varying the magnitude of the pressure of the discharged hydraulic oil supplied to each clutch of the transmission 24. In this way each clutch of the transmission 24 has either a connected operation (engaged operation) or disconnected operation (disengaged operation). Each clutch of the transmission 24 is controlled by a transmission controller, which is not shown on the drawings.

As shown in FIG. 1B, a forward or reverse selection operation lever 5 is provided at the driver's seat of the working vehicle 1 for selecting the forward traveling means (forward clutch) or reverse traveling means (reverse clutch) in accordance with the operated position.

In accordance with the operated position of the forward or reverse selection operation lever 5 (forward position "F", reverse position "R"), the transmission controller selectively engages the forward clutch or the reverse clutch. In this way the working vehicle 1 travels either forward or in reverse.

Also, a shift range lever (not shown in the drawings) is provided at the driver's seat of the working vehicle 1 for selecting the speed change range of the speed step.

The transmission controller selectively engages each speed step clutch in accordance with the operated position of the shift range lever. In this way the working vehicle 1 travels forward or reverses at the selected speed step.

The output shaft of the transmission 24 is connected to an input shaft of the axle 25. The axle 25 includes a differential gear, and a final gear.

An output shaft of the axle 25 is connected to a drive wheel. The tire 30 is fitted to the drive wheel.

On the other hand, the capacity of the hydraulic pump and the direction and flow rate of the direction and flow rate control valve of the hydraulic circuit 91 are controlled by a hydraulic controller, which is not shown in the drawings. In accordance with the operation of the work equipment operation lever 4, the hydraulic controller controls the direction and flow rate of the direction and flow rate control valve, so that the boom 2a moves in either the boom upward direction or the boom downward direction. Also, in accordance with the operation of the work equipment operation lever 4, the hydraulic controller controls the direction and flow rate of the direction and flow rate control valve, so that the bucket 2b moves in the excavation direction or the tilt direction.

As shown in FIG. 1B, an accelerator pedal 6 is provided in the driver's seat of the working vehicle 1. The accelerator pedal 6 is operated by the foot pressing action of the operator, and a signal indicating the amount of foot pressing operation of the accelerator pedal 6, in other words the throttle amount, is input to an engine controller, which is not shown on the drawings.

The engine controller outputs an instruction signal to a governor in accordance with the throttle amount, which controls the engine 10 to obtain a target rotational speed in accordance with the throttle amount.

In other words, the engine 10 is a diesel engine, and control of the engine output is carried out by adjusting the amount of fuel injected into cylinders. This adjustment is carried out by controlling the governor provided in the fuel injection pump of the engine 10. Normally all-speed control type governors are used as the governors, and the engine rotational speed and the fuel injection quantity are adjusted in accordance with the load. In other words, the governor increases or decreases the fuel injection quantity to disappear the difference between a target rotational speed and an actual engine rotational speed.

A part of the output (torque) of the engine 10 is transmitted to the tires 30 as driving force F via the output shaft 21 of the engine 10, the transfer 22, the modulation clutch 40, the torque converter 23, the transmission 24, and the axle 25.

Also, the remainder of the output (torque) of the engine 10 is transmitted to the hydraulic pump of the hydraulic circuit 91, via the output shaft 21 of the engine 10 and the transfer 22. In this way the hydraulic pump is driven, hydraulic oil output from the hydraulic pump is supplied to the hydraulic cylinder via the direction and flow rate control, and operates the work equipment 2.

According to the first vehicle constitution example, it is possible to vary the driving force F transmitted to the tires 30 by adjusting the clutch pressure of the modulation clutch 40 to vary the degree of engagement of the input side 40a and the output side 40b.

In other words, the tire slip detection means 50 of the controller 3 detects the occurrence of tire slip based on signals measured by sensors in various parts of the vehicle.

The following is an example of conditions for detection of occurrence of tire slip.

(Tire Slip Occurrence Detection Conditions)

If at least any of the following Condition 1, Condition 2, or Condition 3 is fulfilled, it is deemed that slip has occurred.

Condition 1: (1) and (2)
Condition 2: (3) and (4) and (5)
Condition 3: (3) and (4) and (6) and (7)

The above (1), (2), (3), (4), (5), (6), and (7) are as follows:

(1) Vehicle speed is 6.0 km/h or less
(2) The difference in speed of the left and right tires 30L, 30R is 4.0 km/h or more
(3) The driving force F is 60 ton or higher
(4) The vehicle speed is 4.5 km/h or less
(5) The difference in speed of the left and right tires 30L, 30R is 2.5 km/h or more
(6) The difference in speed of the left and right tires 30L, 30R is 1.5 km/h or more
(7) The integrated difference in speed of the left and right tires 30L, 30R is 12.0 km/h or more In the above, the vehicle speed and driving force are calculated values taking into account the tire type and the tire correction value. Also, (1) and (4) in the above are examples of values assuming excavation operation under low speed conditions, and (3) in the above is an example of the driving force during excavation operations.

In (7) above, the integrated difference in speed of the left and right tires 30L, 30R is, for example, the absolute value of the sum of the difference in speed of the left and right tires 30L, 30R for the past 11 data. Also, the integrated difference in speed of the left and right tires 30L, 30R is taken to be 0 when the driving force F is less than 60 ton, or the vehicle speed is greater than 4.5 km/h, or the difference in speed of the left and right tires 30L, 30R is less than 1.5 km/h.

When tire slip is detected by the tire slip detection means 50, the driving force measurement means 60 of the controller 3 measures the driving force F0 detected at the time of tire slip.

The driving force F can be obtained by procedures such as the following 1), 2), or 3).

(Calculation of the Driving Force)

1) The speed ratio e is calculated based on the rotational speed Ntin of the input shaft of the torque converter 23 and the rotational speed Ntout of the output shaft of the torque converter 23.

The speed ratio e is obtained from the following equation.

$$e = Ntout/Ntin$$

The rotational speed Ntin of the input shaft of the torque converter is obtained from the following equation based on the rotational speed Ntmout of the output shaft of the transmission 24 and the speed reduction ratio Gs of each speed step.

$$Ntin = Ntmout \times Gs$$

The rotational speed Ntout of the output shaft of the torque converter is equal to the rotational speed Nmcout of the output shaft 40b of the modulation clutch 40 as shown below.

$$Ntout = Nmcout$$

2) Using a map, the primary torque coefficient Pk, which a characteristic coefficient for the performance of each torque converter, is obtained from the speed ratio e.

Here, it is assumed that there is a fixed relationship between the speed ratio e and the primary torque coefficient Pk that is recorded in advance in a map.

The input torque Tin of the torque converter 23 is calculated as shown in the following equation using the rotational speed Ntin of the input shaft of the torque converter and the primary torque coefficient Pk.

$$Tin = Pk \times (Ntin)^2 \times 10^{(-6)}$$

where in the above equation ( )^ means raised to the power of.

3) The driving force F [kgf] is calculated from the following equation using the primary torque coefficient Pk, the torque transmission efficiency et, a transmission speed reduction ratio Gs, a speed reduction ratio Ga of the axle 25, and an effective radius tr of the tires 30.

$$F = Tin \times et \times Gs \times Ga/tr$$

Here the torque ratio et can be obtained from the speed ratio e using a map. It is assumed that there is a fixed relationship between the speed ratio e and the torque ratio et that is recorded in advance as a map. Also, the axle speed reduction ratio Ga can be obtained as a product of a differential gear speed reduction ratio and a final gear speed reduction ratio. Also, the effective radius tr of the tires is a known value (units [m]).

When the driving force F0 detected at the time of tire slip is measured using a procedure such as the above, the driving force control means 70 of the controller 3 controls the modulation clutch 40 as the driving force variation means so that the driving force F is less than the driving force F0 detected at the time of tire slip.

The following is an explanation of the control according to the present invention. Here, the terminology used in this specification document is simply explained. "Control of the driving force" in the present invention is broadly divided into "tire slip prevention control" and "forward control". Further, "tire slip prevention control" is used to mean control that includes "tire slip suppression control" and "restoration control". Also, "tire slip prevention control" is classified into "first tire slip prevention control" and "second tire slip prevention control". Also, "restoration control" is classified into "conventional restoration control" and "the present invention restoration control".

(First Control)

The working vehicle 1 such as a wheel loader or the like has the work equipment 2 for excavation operation as described above, in other words the work equipment 2 that includes the boom 2a and the bucket 2b. This type of working vehicle 1 carries out excavation operation using the work equipment 2. As stated above, during excavation operation the driving force transmitted to the tires 30 increases, so tire slip can easily occur. Therefore, in the present embodiment, control is carried out by the driving force control means 70 during the excavation operation. In this way, it is possible to avoid the repeated occurrence of tire slip during the excavation operation. In the following, the working vehicle 1 is explained assuming that it is a vehicle according to a first vehicle constitution example provided with the modulation clutch 40.

First, a first control is explained. To explain the first control it is assumed that the working vehicle 1 is a vehicle according to the first vehicle constitution example provided with the work equipment 2 for excavation, and provided with the modulation clutch 40.

FIG. 12B shows the constitution of the controller 3 that applies the first control. The controller 3 includes tire slip prevention control means 71 and forward control means 72 as the driving force control means 70. The tire slip prevention control means 71 includes a first tire slip prevention control means 71a.

When the tire slip detection means 50 detects tire slip, the first tire slip prevention control means 71a reduces the driving force to suppress the tire slip, and after the tire slip is suppressed, controls the modulation clutch 40 as driving force variation means so that the driving force F is restored within a range that is less than the driving force F0 detected at the time of tire slip. This is referred to as the first tire slip prevention control.

The first tire slip prevention control, an example of which is shown in FIG. 8A, as carried out by the first tire slip prevention control means 71a is carried out by the same procedure as a second control in FIG. 4, which is described later.

After the first tire slip prevention control is finished, the forward control means 72 controls the modulation clutch 40 as driving force variation means so that the driving force is less than the driving force F0 detected at the time of tire slip.

The forward control, an example of which is shown in FIG. 8B, as carried out by the forward control means 72 is carried out by the same procedure as a third control in FIG. 6B, which is described later.

In other words, when the working vehicle 10 starts excavation operation, the tire slip detection means 50 detects that tire slip has occurred (Step 201).

When tire slip is detected by the tire slip detection means 50, the first tire slip prevention control means 71a carries out the control to reduce the driving force to suppress tire slip, in other words carries out the tire slip suppression control (Step 202).

When the tire slip is suppressed, the first tire slip prevention control means 71a controls the modulation clutch 40 as the driving force variation means, so that the driving force F is restored within a range less than the driving force F0 detected at the time of tire slip (restoration control; Step 203). This restoration control is the "present invention restoration control" that is described later.

The above restoration control is terminated under fixed conditions (Step 204).

However, before termination of the restoration control in Step 204, if tire slip is detected (YES in Step 205), the routine returns to Step 202, and again the tire slip suppression control is carried out. Also, before termination of the restoration control in Step 204, if tire slip is not detected (NO in Step 205), the routine returns to Step 203, and the restoration control is carried out again.

When the first tire slip prevention control is finished, the forward control means 72 controls the modulation clutch 40 as driving force variation means so that the driving force is less than the driving force F0 detected at the time of tire slip (forward control; Step 401).

Next, it is determined whether or not the conditions for suspending the forward control are fulfilled, in other words the tire slip detection means 50 determines whether or not tire slip has occurred (Step 402).

If the occurrence of tire slip has not been detected (NO at Step 402), in the next Step 403 it is determined whether or not the conditions for terminating the forward control have been fulfilled (Step 403).

If the occurrence of tire slip has not been detected and the conditions for terminating the forward control have not been fulfilled (NO at Step 403), the forward control continues as it is.

However, if the occurrence of tire slip has been detected (YES at Step 402), the forward control is temporarily suspended, the routine returns to Step 202, and transfers the first tire slip prevention control.

Also, if the conditions for terminating the forward control are fulfilled (YES at Step 403), the forward control is terminated (Step 404).

Here the tire slip suppression control, the restoration control (present invention restoration control), the restoration control (present invention restoration control) termination conditions, the forward control, the forward control suspend conditions, and the forward control termination conditions are explained in detail.

(Tire Slip Suppression Control)

FIGS. 13A and 13B show an example of a table and graph of the relationship between the driving force F0 [kgf] detected at the time of tire slip and the modulation clutch pressure [kg/cm^2] corresponding to this driving force F0 detected at the time of tire slip.

The relationship shown in FIG. 13 is verified by tests or simulation to be capable of positively suppressing tire slip when the driving force F0 is measured.

The relationship shown in FIG. 13 is stored within the controller 3.

FIGS. 14A and 14B show an example of table and graph of the relationship between the modulation clutch pressure [kg/cm^2] and the target current [mA].

When the modulation clutch pressure is at the minimum value 0.0 kg/cm^2 and the target current is at the minimum value 150 mA, the modulation clutch 40 is in the completely disengaged state, and when the modulation clutch pressure is at the maximum value 25.0 kg/cm^2 and the target current is at the minimum value 700 mA, the modulation clutch 40 is completely engaged.

The tire slip prevention control means 71 generates a target electrical current in order to make the modulation clutch pressure correspond to a specific driving force that is less than the driving force F0 detected at the time of tire slip, in accordance with FIG. 13 and FIG. 14, and outputs an electrical current instruction corresponding to the target electrical current. In this case the driving force is set to a driving force that, for example, is considered to be sufficiently reduced to suppress the tire slip. The modulation clutch pressure is varied in accordance with the output electrical current instruction, and the driving force F is reduced.

The following is an example of the conditions for terminating the tire slip suppression control.

If at least any of the following Condition 11, Condition 12, or Condition 13 is fulfilled, the tire slip suppression control is terminated, and the routine proceeds to the succeeding restoration control.

Condition 11: it is after 0.3 seconds elapses from the time when tire slip has been detected that the work equipment 2 is operated in a specific direction, in other words the boom 2a has been operated in the boom upwards direction, or the bucket 2b has been operated in the tilt direction Condition 12: 1.0 seconds has passed after detecting tire slip Condition 13: The driving force F has been reduced to 12.0 tons or less In other words, when it is determined that tire slip has been properly suppressed, or when it is determined that the excavation operation is completed, and it is not necessary to suppress the tire slip, the tire slip suppression control is terminated.

(Restoration Control (Present Invention Restoration Control))

FIG. 15 shows an example of a control map of the corresponding relationship of the target electrical current increase/decrease instruction (current instruction) and the left and right tire speed difference [km/h] (horizontal axis) and the present driving force F [kgf] (vertical axis).

The control map shown in FIG. 15 restores the driving force F within a range that is less than the driving force F0 detected at the time of tire slip, and is verified by tests or simulation in which the modulation clutch 40 can be in the fully engaged state. The control map shown in FIG. 15 is stored in the controller 3.

In other words, when the difference in speed of the left and right tires 30L, 30R is less than 1.5 km/h, the target electrical current is increased by 10 mA per 10 msec in order to increase the modulation clutch pressure (hereafter referred to as the electrical current increase instruction).

However, the electrical current increase instruction is only output when the present driving force F is less than 90% of the driving force F0 detected at the time of tire slip (hereafter referred to as the first driving force limiting control during restoration).

When the difference in speed of the left and right tires 30L, 30R is greater than 1.5 km/h, the target electrical current is decreased by 10 mA per 10 msec in order to decrease the modulation clutch pressure (hereafter referred to as the electrical current decrease instruction).

When the present driving force F is equal to or greater than 95% of the driving force F0 detected at the time of tire slip, the target current is decreased by 10 mA per 10 msec in order to decrease the modulation clutch pressure (hereafter referred to as the second driving force limiting control during restoration).

As described above, the modulation clutch pressure is increased only when the difference in the left and right tire speed has reduced so that there is no danger of occurrence of tire slip, and when the driving force F is within a specific range that is lower than the driving force F0 detected at the time of tire slip.

(Conditions for Terminating the Restoration Control (Present Invention Restoration Control))

When the target current reaches the maximum value of 700 mA, and the modulation clutch pressure reaches the maximum value of 25.0 kg/cm^2, in accordance with FIG. 14, the modulation clutch 40 is fully engaged. At this time the control is terminated.

(Forward Control)

The control details of the forward control are the same as the details of the first driving force limitation control during restoration, and the second driving force limiting control during restoration, as described previously. In other words, When the present driving force F is less than 90% of the driving force F0 detected at the time of tire slip, the target electrical current is increased by 10 mA per 10 msec in order to increase the modulation clutch pressure, and the electrical current increase instruction is output.

When the present driving force F is equal to or greater than 95% of the driving force F0 detected at the time of tire slip, the target electrical current is decreased by 10 mA per 10 msec in order to decrease the modulation clutch pressure, and the electrical current decrease instruction is output.

However, the current value is increased or decreased within the range 150 mA to 700 mA, in other words the modulation clutch pressure is increased or decreased within the range 0 to 25.0 kg/cm^2 (the range from completely disengaged to completely engaged).

As described above, the modulation clutch pressure is controlled so that the current driving force F is maintained within a specific range that is lower than the driving force F0 detected at the time of tire slip.

(Conditions for Suspending the Forward Control)

While the forward control as described above is being executed, tire slip can occur due to changes in the ground surface state or the like. In this case, the limiting driving force to cause tire slip has been reduced, so it is desirable to again transfer to the first tire slip prevention control to properly suppress the tire slip, and update the driving force F0 detected at the time of tire slip.

Therefore, in the first control, when the forward control is being executed, when tire slip is detected by the tire slip detection means 50 (YES at Step 402), the control by the forward control means 72 is stopped to give priority to the first tire slip prevention control, the routine returns to Step 202, and transfers to the first tire slip prevention control.

As a result, the driving force F0 detected at the time of tire slip is updated, and the first tire slip prevention control is carried out based on the updated driving force F0. When the first tire slip prevention control is finished and the forward control is re-started, the driving force is limited to less than the updated driving force F0 detected at the time of tire slip, and the tire slip is suppressed. In this way, the first control can respond flexibly to changes in the ground surface and the like.

(Conditions for Termination of the Forward Control)

During excavation operations, when the work equipment 2 which is the boom 2a is operated in the upwards direction or the bucket 2b is operated in the tilt direction using the work equipment operation lever 4, the vertical resistance force of the ground surface against the tires 30 increases, so that the friction between the tires 30 and the ground surface increases, and tire slip becomes more difficult to occur. Therefore, in this kind of situation there is no necessity to deal with tire slip by limiting the driving force, and on the contrary it is desirable to terminate the forward control and cancel the limitation on the driving force, in order to increase the operability of the work equipment.

Also, the operator indicates the intention to temporarily terminate the excavation operation by operating the work equipment 2 in a specific direction using the forward or reverse selection operation lever 5. Also, when the traveling direction of the working vehicle 1 is changed to the opposite direction, for example when the working vehicle 1 is switched from the forward direction F to the reverse direction R, the work equipment 2 is far from the mound of soil or the like. This means that one excavation cycle has finished. When one excavation cycle finishes, tire slip is more difficult to occur. Also, the ground surface condition will change from the current excavation to the next excavation cycle. Therefore, in these circumstances it is not necessary to deal with tire slip by limiting the driving force, and on the contrary it is desirable to terminate the forward control and cancel the limitation of the driving force in preparation for the start of the next excavation cycle.

Therefore, in the first control, while forward control is being executed, if the work equipment 2 is operated in a specific direction or if the direction of travel of the working vehicle 1 is changed to the opposite direction (YES at Step 403), the forward control is terminated (Step 404).

According to the first control, the state in which the driving force is unnecessarily limited can be canceled, and it is possible to prepare for the start of the next excavation cycle.

At the time that the conditions for terminating the forward control are fulfilled, the driving force F0 detected at the time of tire slip is reset. When resetting, a large number is set, so that the forward control does not operate.

The operation and result of the first control is explained using FIG. 3 and FIG. 9.

FIG. 9A shows an example of the variation of the driving force F with time using the first control during an excavation operation, FIG. 9B shows an example of the variation of the clutch pressure with time for the case that the driving force variation means 40 is the modulation clutch 40, and FIG. 9C shows an example of the variation of the driving force F with time using conventional technique during an excavation operation, as a comparative example.

FIG. 3A shows an example of the variation of the rotational speed of the left and right tires 30L, 30R using the first control (it is also the same in the second control, which is described later) during an excavation operation, and FIG. 3B shows an example of the variation of the rotational speed of the left and right tires 30L, 30R using conventional technique during an excavation operation, as a comparative example.

In the case of the first control, when the occurrence of tire slip is detected, the driving force F is reduced so that the tire slip is suppressed. Then after the tire slip has been suppressed, the driving force F is restored within a range that is less than the driving force F0 detected at the time of tire slip (FIG. 9). Therefore tire slip occurs once, and even though the driving force F is greatly reduced as a result, subsequently it is possible to prevent the occurrence of tire slip for as long as the first tire slip prevention control is being carried out (FIG. 3A).

In contrast, in the case of the conventional technique (Patent Document 1), when the occurrence of tire slip is detected, the modulation clutch pressure is decreased, the degree of engagement of the modulation clutch 40 is weakened, and the driving force F transmitted to the tires 30 is reduced, so tire slip is temporarily suppressed. Although the tire slip is temporarily suppressed, when the modulation clutch pressure is restored to the original state after the tire slip is suppressed, the modulation clutch pressure is gradually increased in accordance with the difference in rotational speed of the left and right drive wheels, without taking into consideration the driving force transmitted to the tires 30 or the dynamic frictional force. As a result tire slip occurs again while the modulation clutch pressure is being increased. Subsequently suppression of the tire slip due to decreasing the modulation clutch pressure, and occurrence of tire slip due to increasing the modulation clutch pressure are alternately repeated (FIG. 9C).

Therefore in the conventional technique, although tire slip is temporarily suppressed, tire slip repeatedly occurs during the time that the modulation clutch pressure is being restored (FIG. 3B).

In this way, according to the first control, similar to the second control, which is described later, while the first tire slip prevention control is being carried out, it is possible to ensure that tire slip does not repeatedly occur (FIG. 3A). Therefore the present invention solves the problem of reduction of work efficiency due to tire slip and the problems of reduction in durability due to tire damage and the large cost for the user of changing the tires.

Also, unlike the case where the driving force is set in advance by the operator, it is possible to transmit the appropriate driving force in accordance with the ground surface conditions.

FIG. 16 shows an example of the change in the situation in the first tire slip prevention control and the forward control. In FIG. 16, the horizontal axis represents time, and ON on the vertical axis means that the control is being executed, and OFF on the vertical axis means that the control is either suspended or the control is terminated.

As shown in FIG. 16, when tire slip is detected at time $\tau 0$, the driving force F0 at the time of detection is measured, and the measured driving force F0 is stored, and the first tire slip prevention control is started and turned ON.

At the time $\tau 1$, the tire slip prevention control is terminated and turned OFF, and the forward control is started and turned ON.

If at time $\tau 2$ during execution of the forward control, tire slip is detected again, the driving force F0' at that time is measured. Then the previously stored driving force F0 detected at the time of tire slip is replaced and updated with the driving force F0' that was measured this time.

At the same time $\tau 2$, the forward control is suspended and turned OFF, and the first tire slip prevention control is started and turned ON. The re-started first tire slip prevention control is carried out based on the updated driving force F0'.

At the time $\tau 3$, the first tire slip prevention control is terminated and turned OFF, and the forward control is re-started and turned ON.

At the time $\tau 4$, when the conditions for terminating the forward control are fulfilled, such as by the operator operating the work equipment 2 or the like, the forward control is terminated.

In FIG. 16, the part "first tire slip prevention control" is replaced with "the second tire slip prevention control" in the third control, which is described later, and the same control as described above is carried out.

Further, according to the first control, the following operation and effect is obtained.

In the case of the first control, when the occurrence of tire slip is detected, the first tire slip prevention control is started, and the driving force F is reduced to suppress the tire slip (tire slip suppression control; Step 202). Here, in order to positively suppress the tire slip, the modulation clutch pressure is forcibly and suddenly decreased to a very low value and the driving force F is suddenly reduced, as shown in FIG. 13. Therefore, the operator on the working vehicle 1 feels that something is different and a shock is applied to the operator and the vehicle body 1a of the working vehicle 1. Then after the tire slip has been suppressed, the modulation clutch pressure is increased and the driving force F is restored, and the first tire slip prevention control is terminated. The first tire slip prevention control is terminated when, for example, the modulation clutch pressure is increased to a specific maximum pressure (25.0 kg/cm^2) corresponding to complete engagement (FIGS. 9A, 9B).

After the first tire slip prevention control is terminated, the forward control is started. When the forward control is started, thereafter the modulation clutch 40 as driving force variation means is controlled so that the driving force is less than the driving force F0 detected at the time of tire slip. Here, it is assumed that the operator again attempts to increase the driving force F by pressing the accelerator pedal or the like. However, after the start of forward control, the driving force F is suppressed to be less than the driving force F0 detected at the time of tire slip, so the driving force does not reach a force that causes tire slip, and it is possible to prevent the occurrence of tire slip. Therefore, subsequently it is possible to avoid transferring to the tire slip prevention control due to the detection of tire slip. Therefore, it is possible to avoid re-starting the tire slip prevention control, carrying out the control to suppress the tire slip, and preventing the large drop in the driving force F due to the tire slip suppression control (Step 202) as described above. As a result, the operator does not feel that something is different and a shock is not applied to the operator and the vehicle body 1a.

In contrast, in the case of the conventional technique (Patent Document 1), when the occurrence of tire slip is detected, the tire slip prevention control is started, and the driving force is reduced to suppress the tire slip (tire slip suppression control). Here, in order to positively suppress the tire slip, the modulation clutch pressure is forcibly and suddenly decreased to a very low value and the driving force F is suddenly reduced. Therefore, the operator on the working vehicle 1 feels that something is different and a shock is applied to the operator and the vehicle body. Then, after the tire slip has been suppressed, the driving force F is restored, and the tire slip suppression control is terminated. The tire slip prevention control is terminated when, for example, the modulation clutch pressure is increased to the complete engagement pressure (FIG. 9C).

Also, after termination of the tire slip prevention control, unlike the first control, the forward control is not executed. Therefore, when the operator again attempts to increase the driving force F by pressing the accelerator pedal or the like, the driving force F exceeds the limit for causing tire slip, so tire slip occurs again. Therefore, subsequently the tire slip prevention control is again started when the tire slip is detected, the tire slip suppression control is executed as described above, and as a result the driving force F is greatly reduced. As a result, again the operator feels that something is different, and a shock is applied to the operator and to the vehicle body 1a.

In this way, according to the first control, the forward control is carried out, so at least while the forward control is being executed, tire slip is positively suppressed.

Moreover, by executing the forward control, it is possible to prevent transferring again to the tire slip prevention control. Therefore, it is possible to avoid giving the operator the feeling that something is different and applying a shock to the operator and the vehicle body 1a as a result of again carrying out the tire slip prevention control (tire slip suppression control).

In this way, according to the first control, similar to the third control which is described later, the forward control is carried out, and thus tire slip is positively suppressed, even in the time period after termination of the first tire slip prevention control (FIG. 9A).

Moreover, by carrying out the forward control, it is possible to prevent transferring again to the tire slip prevention control (tire slip suppression control). Therefore, giving the operator the feeling that something is different and applying a shock to the operator and the vehicle body 1a due to again carrying out the tire slip prevention control (tire slip suppression control) is avoided.

(Second Control)

Next, the second control will be explained.

The second control is formed by eliminating the forward control from the first control as described above.

In the following explanation of the second control, it is assumed that the first vehicle constitution example is the working vehicle 1 provided with the work equipment 2 and provided with the modulation clutch 40.

FIG. 12A shows the constitution of the controller 3 that applies the second control. The controller 3 is provided with the tire slip prevention control means 71 as the driving force control means 70. The tire slip prevention control means 71 includes the first tire slip prevention control means 71a.

When tire slip is detected by the tire slip detection means 50, the first tire slip prevention control means 71a reduces the driving force to suppress the tire slip, and after the tire slip is suppressed, controls the modulation clutch 40 as driving force variation means so that the driving force F is restored within a range that is less than the driving force F0 detected at the time of tire slip (first tire slip prevention control).

The first tire slip prevention control by the first tire slip prevention control means 71a is carried out by the procedure shown as an example in FIG. 4.

In other words, when the working vehicle 10 starts the excavation operation, the tire slip detection means 50 detects the occurrence of tire slip (Step 201).

When tire slip is detected by the tire slip detection means 50, the first tire slip prevention control means 71a carries out the control to reduce the driving force in order to suppress the tire slip (hereafter referred to as the tire slip suppression control) (Step 202).

When the tire slip is suppressed, the first tire slip prevention control means 71a controls the modulation clutch 40 as driving force variation means in order to restore the driving force F within the range less than the driving force F0 detected at the time of tire slip (restoration control (present invention restoration control); Step 203).

The above restoration control is terminated under fixed conditions (hereafter referred to as control termination) (Step 204).

However, before termination of restoration control in Step 204, if tire slip is detected (YES at Step 205), the routine returns to Step 202, and the tire slip suppression control is carried out. Also, before termination of the restoration control in Step 204, if tire slip is not detected (NO at Step 205), the routine returns to Step 203, and again the restoration control is carried out.

The details of the above tire slip suppression control, the details of the restoration control (present invention restoration control), and the conditions for termination of the restoration control (present invention restoration control) are the same as for the first control, and so are omitted.

The operation and effect of the second control are explained using FIGS. 2C, 3, and 5.

FIG. 5A shows an example of the variation of the driving force F with time using the second control during operation, FIG. 5B shows an example of the variation of the clutch pressure with time for the case that the driving force variation means 40 is the modulation clutch 40, and FIG. 2C shows an example of the variation of the driving force F with time using conventional technique during an excavation operation, as a comparative example.

In the case of the second control, when the tire slip is detected, the driving force F is reduced so that the tire slip is suppressed. Then, after the tire slip has been suppressed, the driving force F is restored within the range that is less than the driving force F0 detected at the time of tire slip (FIG. 5). As a result even though tire slip occurs once, and the driving force F is greatly reduced as a result, and subsequently as long as the first tire slip prevention control is being carried out, it is possible to prevent the occurrence of tire slip (FIG. 3A).

In contrast, in the case of the conventional technique (Patent Document 1), when the occurrence of tire slip is detected, the modulation clutch pressure is decreased, the degree of engagement of the modulation clutch 40 is weakened, and the driving force F transmitted to the tires 30 is reduced, so tire slip is temporarily suppressed. Although the tire slip is temporarily suppressed, when the modulation clutch pressure is restored to the original state after suppressing the tire slip, the modulation clutch pressure is gradually increased in accordance with the difference in rotational speed of the left and right drive wheels, without taking into consideration the driving force transmitted to the tires 30 or the dynamic frictional force. As a result tire slip occurs again while the modulation clutch pressure is being increased. Subsequently suppression of the tire slip by decreasing the modulation clutch pressure, and occurrence of tire slip due to increasing the modulation clutch pressure are alternately repeated (FIG. 2C).

Therefore in the conventional technique, although tire slip is temporarily suppressed, tire slip repeatedly occurs during the time that the modulation clutch pressure is being restored (FIG. 3B).

In this way, according to the second control, while the first tire slip prevention control is being carried out, it is possible ensure that tire slip does not repeatedly occur. Therefore the present invention solves the problem of reduction of work efficiency due to tire slip and the problems of reduction in durability due to tire damage and the large cost for the user of changing the tires.

(Third Control)

Next, the third control will be explained.

The third control is a control in which, in the first control as described above, the "conventional restoration control" is performed as the restoration control, rather than the "present invention restoration control."

In the following explanation of the third control, it is also assumed that the first vehicle constitution example is the working vehicle 1 provided with the work equipment 2 and provided with the modulation clutch 40.

FIG. 12B shows the constitution of the controller 3 that applies the third control. The controller 3 is provided with the tire slip prevention control means 71 and the forward control means 72 as the driving force control means 70. The tire slip prevention control means 71 includes the second tire slip prevention control means 71b.

When tire slip is detected by the tire slip detection means 50, the second tire slip prevention control means 71b reduces the driving force F to suppress the tire slip, and after the tire slip is suppressed, controls the modulation clutch 40 as driving force variation means so that the driving force F is restored. This is referred to as the second tire slip prevention control.

The second tire slip prevention control includes the tire slip suppression control and the conventional restoration control.

The second tire slip prevention control by the second tire slip prevention control means 71b is carried out by the procedure shown as an example in FIG. 6A. However, unlike FIG. 4, the restoration control (present invention restoration control) (Step 203 in FIG. 4) to restore the driving force F within the range less than the driving range F0 detected at the time of the tire slip is not carried out. The modulation clutch pressure is increased in accordance with the left and right tire speed difference only, as is the case with the conventional technique (conventional restoration control).

After termination of the second tire slip prevention control, the forward control means 72 controls the driving force variation means 40 so that the driving force F driving force is less than the driving force F0 detected at the time of the tire slip.

The forward control by the forward control means 72 is a routine shown as an example in FIG. 6B.

In other words, when the working vehicle 1 starts an excavation operation, the tire slip detection means 50 detects the occurrence of tire slip (Step 301).

When tire slip is detected by the tire slip detection means 50, the second tire slip prevention control means 71b carries out the control to reduce the driving force in order to suppress the tire slip, in other words the tire slip suppression control described previously is carried out (Step 302).

When the tire slip is suppressed, the second tire slip prevention control means 71b controls the modulation clutch 40 as driving force variation means to be fully engaged in order to restore the driving force F (conventional restoration control; Step 303).

The conventional restoration control is terminated when the condition for termination of the control as described previously is fulfilled, in other words when there is complete engagement, as is the case with the present invention restoration control (Step 304).

However, prior to termination of the conventional control in Step 304, if tire slip is detected (YES at Step 305), the routine returns to Step 302, and again the tire slip suppression control is carried out. Also, prior to termination of the conventional control in Step 304, if tire slip is not detected (NO at Step 305), the routine returns to Step 303, and again the conventional restoration control is carried out.

The following is a further detailed description of Step 303 in the conventional restoration control.

(Conventional Restoration Control)

The conventional restoration control is formed by removing from the restoration control as described previously the first driving force limiting control during restoration and the second driving force limiting control during restoration. In this conventional restoration control, the electrical current increase/decrease instruction is output in accordance with the speed difference between the left and right tires 30L, 30R to control the modulation clutch pressure, as described below.

In other words, when the difference in speed of the left and right tires 30L, 30R is less than 1.5 km/h, the electrical current increase instruction is output to increase the target current by 10 mA per 10 msec in order to increase the modulation clutch pressure.

When the difference in speed of the left and right tires 30L, 30R is greater than 1.5 km/h, the electrical current reduction instruction is output to reduce the target current by 10 mA per 10 msec in order to decrease the modulation clutch pressure.

As described above, the modulation clutch pressure is increased only when the difference in the left and right tire speed has reduced so that there is no danger of occurrence of tire slip.

When the second tire slip prevention control is terminated as shown in FIG. 6A, the forward control is carried out. In other words, when the second tire slip prevention control is terminated, the forward control means 72 controls the modulation clutch 40 as driving force variation means so that the driving force is less than the driving force F0 detected at the time of tire slip (Step 401).

Next, it is determined whether or not the conditions for stopping the forward control have been fulfilled, in other words it is determined whether or not the occurrence of tire slip has been detected by the tire slip detection means 50 (Step 402).

If tire slip has not been detected (NO at Step 402), in the next Step 403 it is determined whether or not the conditions for terminating the forward control have been fulfilled (Step 403).

If tire slip has not been detected, and if the conditions for terminating the forward control have not been fulfilled (NO at Step 403), the forward control is continued as it is.

However, if tire slip has been detected (YES at Step 402), the forward control is temporarily stopped, the routine returns to Step 302, and transfers to the second tire slip prevention control.

Also, if the conditions for terminating the forward control have been fulfilled (YES at Step 403), the forward control is terminated (Step 404).

The details of the forward control, the conditions for stopping the forward control, and the conditions for terminating the forward control are the same as those explained for the first control. However, as described below, when the control is stopped, the routine transfers to the "second tire slip prevention control," rather than the "first tire slip prevention control."

(Conditions for Stopping the Forward Control)

While executing the forward control, tire slip can occur due to variations in the ground surface conditions or the like. In this situation, the limiting driving force for causing tire slip decreases, so it is desirable to transfer again to the second tire slip prevention control to positively suppress the tire slip, and to update the driving force F0 detected at the time of tire slip.

Therefore, in the third control, when tire slip is detected by the tire slip detection means 50 during execution of the forward control (YES at Step 402), the second tire slip prevention control should be preferentially carried out. Thus, the control by the forward control means 72 is stopped, the routine returns to Step 302, and transfers to the second tire slip prevention control.

As a result, the driving force F0 detected at the time of tire slip is updated, and the second tire slip prevention control is carried out based on the updated driving force F0. When the second tire slip prevention control is finished and the forward control is re-started, the driving force is limited to less than the updated driving force F0 detected at the time of tire slip. In this way, it is possible to deal flexibly with variations in the ground surface conditions and the like according to the third control.

The operation and effect of the third control will be explained using FIG. 7.

FIG. 7A shows an example of the variation of the driving force F with time using the third control during an excavation operation, FIG. 7B shows an example of the variation of the clutch pressure with time for the case that the driving force variation means 40 is the modulation clutch 40, and FIG. 7C shows an example of the variation of the driving force F with time using conventional technique during an excavation operation, as a comparative example.

In the case of the third control, when the occurrence of tire slip is detected, the second tire slip prevention control is started, and the driving force F is reduced so that the tire slip is suppressed (tire slip suppression control; Step 302). Here, in order to positively suppress the tire slip the modulation clutch pressure is forcibly and suddenly decreased to a very low value, as shown in FIG. 13. Therefore, the operator on the working vehicle 1 feels that something is different and a shock is applied to the operator and the vehicle body 1*a* of the working vehicle 1. Then after the tire slip has been suppressed, the modulation clutch pressure is increased and the driving force F is restored, and the second tire slip prevention control is terminated. The second tire slip prevention control is terminated when, for example, the modulation clutch pressure is increased to a specific maximum pressure (25.0 kg/cm^2) corresponding to complete engagement (FIGS. 7A, 7B).

After the second tire slip prevention control is terminated, the forward control is started. When the forward control is started, thereafter the modulation clutch 40 as driving force variation means is controlled so that the driving force is less than the driving force F0 detected at the time of tire slip. Here, it is assumed that the operator again attempts to increase the driving force F by pressing the accelerator pedal or the like. However, after the start of the forward control, the driving force F is suppressed to be less than the driving force F0 detected at the time of tire slip, so the driving force does not reach a force that causes tire slip, and it is possible to prevent the occurrence of tire slip. Therefore, subsequently it is possible to avoid transferring to the tire slip prevention control due to the detection of tire slip. Therefore, it is possible to avoid re-starting the tire slip prevention control, carrying out the control to suppress the tire slip and preventing the large drop in the driving force F due to the tire slip suppression control (Step 302) as described above. As a result, the operator does not feel that something is different and a shock is not applied to the operator and the vehicle body 1*a*.

In contrast, in the case of the conventional technique (Patent Document 1), when the occurrence of tire slip is detected, the tire slip prevention control is started, and the driving force is reduced to suppress the tire slip (tire slip suppression control). Here, in order to positively suppress the tire slip, the modulation clutch pressure is forcibly and suddenly decreased to a very low value and the driving force F is suddenly reduced. Therefore, the operator on the working vehicle 1 feels that something is different and a shock is applied to the operator and the vehicle body. Then, after the tire slip has been suppressed, the driving force F is restored, and the tire slip suppression control is terminated. The tire slip prevention control is terminated when, for example, the modulation clutch pressure is increased to the complete engagement pressure (FIG. 7C).

After termination of the tire slip prevention control, unlike the third control, the forward control is not executed. Therefore, when the operator again attempts to increase the driving force F by pressing the accelerator pedal or the like, the driving force F exceeds the limit for causing tire slip, so tire slip occurs again. Therefore, subsequently the tire slip prevention control is again started when the tire slip is detected, the tire slip suppression control is executed as described above, and as a result the driving force F is greatly reduced. As a result, again the operator feels that something is different, and a shock is applied to the operator and to the vehicle body 1*a*.

In this way, according to the third control, the forward control is carried out, so at least while the forward control is being executed tire slip is positively suppressed.

Moreover, by executing the forward control, it is possible to prevent transferring again to the tire slip prevention control. Therefore, it is possible to avoid giving the operator the feeling that something is different and applying a shock to the operator and the vehicle body 1*a* as a result of again carrying out the tire slip prevention control (tire slip suppression control).

In the first control, the second control, and the third control as described above, the driving force F was limited by controlling the modulation clutch 40, but as shown in a second vehicle constitution example that is described later, the driving force F may be limited by controlling capacity variation means 40 and/or the engine 10 rotational speed. Also, the driving force F may also be limited by controlling the pressure of hydraulic oil flowing in a closed circuit 83.

Also, in the first control, the second control, and the third control as described above, control is carried out to limit the driving force F during excavation operations, but the control to limit the driving force F in other operations where tire slip can also easily occur may also be carried out. Also, the control may also be applied in a similar way to work vehicles 1 that are not equipped with a work equipment for excavation.

(Fourth Control)

FIG. 11 shows a flowchart for a fourth control.

In other words, when the working vehicle 10 starts an excavation operation, the tire slip detection means 50 detects the occurrence of tire slips (Step 101).

Next, when the tire slip detection means 50 detects tire slip, the driving force measurement means 60 measures the driving force F0 detected at the time of tire slip (Step 102).

Next, the driving force control means 70 controls the modulation clutch 40 as the driving force variation means, so that the driving force F is less than the driving force F0 detected at the time of tire slip (Step 103).

The operation and effect of the fourth control will be explained using FIGS. 2 and 3.

FIG. 2A shows an example of the variation of the driving force F with time using the fourth control during an excavation operation, and shows an example of the variation of the clutch pressure with time for the case that the driving force variation means 40 is the modulation clutch 40. FIG. 2C shows an example of the variation of the driving force F with time using the conventional technique, during an excavation operation.

FIG. 3A shows an example of the variation of the rotation speed of the left and right tires 30L, 30R using the fourth control during an excavation operation, and FIG. 3B shows an example of the variation of the rotational speed of the left and right tires 30L, 30R using the conventional technique during an excavation operation, as a comparative example.

In the case of the fourth control, when the occurrence of tire slip is detected, the modulation clutch 40 is controlled so that the driving force F is less than the driving force F0 detected at the time of tire slip. As a result the driving force F is controlled to be less than the driving force F0 (FIGS. 2A, 2B). Therefore although tire slip occurs once, subsequently it is possible to prevent the occurrence of tire slip throughout the whole period of the excavation operation. FIG. 3A shows that tire slip occurs at the tire 30L from among the left and right tires 30L, 30R. The rotational speed of the other tire 30R is virtually zero (FIG. 3A).

In contrast, in the case of the conventional technique (Patent Document 1), when the occurrence of tire slip is detected, the modulation clutch pressure is decreased, the degree of engagement of the modulation clutch 40 is weakened, and the driving force F transmitted to the tires 30 is reduced, so tire slip is temporarily suppressed. Although the tire slip is temporarily suppressed, after suppressing the tire slip, the modulation clutch pressure is gradually increased in accordance with the difference in rotational speed of the left and right drive wheels only, without taking into consideration the driving force transmitted to the tires 30 or the dynamic frictional force. As a result tire slip occurs again while the modulation clutch pressure is being increased. Subsequently suppression of the tire slip due to decreasing the modulation clutch pressure, and occurrence of tire slip due to increasing the modulation clutch pressure are alternately repeated (FIG. 2C).

Therefore in the conventional technique, although tire slip is temporarily suppressed, tire slip repeatedly occurs throughout the whole period that excavation is being carried out (FIG. 3B).

In this way, according to the fourth control, it is possible to prevent the repeated occurrence of tire slip during excavation and other situations where tire slip can easily occur. Therefore the present invention solves the problem of reduction of work efficiency due to tire slip and the problems of reduction in durability due to tire damage and the large cost for the user of changing the tires.

In the above explanation of the first control, the second control, the third control, and the fourth control with the assumption that the first vehicle constitution example is employed, the clutch pressure of the modulation clutch 40 was controlled, but instead of controlling the clutch pressure of the modulation clutch 40, it may be also possible to carry out control of the clutch pressure of the transmission 24.

Measurement of the driving force F may be carried out when tire slip is detected, or it may be constantly carried out.

(Second Vehicle Constitution Example)

FIG. 1A shows the example of the vehicle constitution in which the modulation clutch 40 is provided in the traveling driving force transmission path 20. However, the present invention may also be applied to a working vehicle 1 constituted with a hydrostatic transmission (HST) 80 provided in the driving force transmission path 20, as shown in FIG. 10.

As shown in FIG. 10, the hydrostatic transmission 80 includes a hydraulic pump 81 that is connected to the output shaft 21 of the engine 10, a hydraulic motor 82 connected to the tire 30, and a closed circuit 83 connected to the hydraulic pump 81 and the hydraulic motor 82, in other words a circuit 83 in which the flow of oil pressure is closed.

The hydraulic pump 81 is a variable capacity 2-way flow, 1-way rotational type hydraulic pump.

The hydraulic motor 82 is a variable capacity 2-way flow, 2-way rotational type hydraulic motor.

The output shaft 82a of the hydraulic motor 82 is connected to a transfer 84. The transfer 84 is connected to the drive wheels to which the tires 30 are fitted.

A swash plate in the hydraulic pump 81 is connected to an actuator 46 for varying the pump capacity.

A swash plate in the hydraulic motor 82 is connected to an actuator 47 for varying the motor capacity.

Capacity variation means including the actuator 46 for varying the pump capacity and the actuator 47 for varying the motor capacity forms driving force variation means 40.

A fixed capacity hydraulic pump 45 for varying the capacity is connected to the output shaft 21 of the engine 10. The actuator 46 for varying the pump capacity and the actuator 47 for varying the motor capacity are actuated in accordance with electrical signals output from a HST controller 48.

Hydraulic oil output from the fixed capacity hydraulic pump 45 flows to the actuator 46 for varying the pump capacity and the actuator 47 for varying the motor capacity. The actuator 46 for varying the pump capacity and the actuator 47 for varying the motor capacity are each actuated in accordance with control electrical signals output from the HST controller 48. In this way the angle of the swash plate of the hydraulic pump 81 and the angle of the swash plate of the hydraulic motor 82 are each adjusted, and the capacity qp of the hydraulic pump 81 and the capacity qM of the hydraulic motor 82 are each controlled. Here, for both the pump and the motor, "capacity" is the quantity output per revolution (in units of, for example, cc/rev).

The HST controller 48 includes the tire slip detection means 50, the driving force measurement means 60, and the driving force control means 70.

The output shaft 21 of the engine 10 is provided with an engine rotation sensor 7 for measuring the rotational speed of the engine 10.

The output shaft 82a of the hydraulic motor 82 is provided with a motor output shaft rotation sensor 8 for measuring the rotational speed of the output shaft 82a of the hydraulic motor 82.

Signals indicating the amount that the accelerator pedal 6 has been pressed, in other words the amount of throttle, signals indicating the engine rotational speed, and signals indicating the output shaft rotational speed of the hydraulic motor are input to the HST controller 48.

The HST controller 48 controls the engine rotational speed, controls changes in speed, and controls the driving force.

The HST controller 48 controls the rotational speed of the engine so that the engine rotational speed is increased in accordance with the amount of throttle.

The HST controller 48 automatically varies the speed change ratio $r=qp/qM$ of the hydraulic pump 81 and the hydraulic motor 82 in accordance with the amount of throttle, to vary the speed. By either increasing the capacity qp of the hydraulic pump 81 or reducing the capacity qM of the hydraulic motor 82, shifting up is carried out in which the hydraulic motor 82 has high rotational speed and low torque, and the speed change ratio r ($=qp/qM$) of the hydraulic pump 81 and the hydraulic motor 82 is high. Also, by either reducing the capacity qp of the hydraulic pump 81 or increasing the capacity qM of the hydraulic motor 82, shifting down is carried out in which the hydraulic motor 82 has low rotational speed and high torque, and the speed change ratio r ($=qp/qM$) of the hydraulic pump 81 and the hydraulic motor 82 is low.

The speed change ratio r is controlled to be the optimum value on the basis of the amount that the accelerator pedal is depressed, and the engine rotational speed or the vehicle speed at that time.

By varying the optimum controlled speed reduction ratio of the hydrostatic transmission (HST) 80, it is possible to vary the driving force F transmitted to the tires 30. For example, by reducing the capacity qp of the hydraulic pump 81 from the optimum speed change ratio r, and/or by increasing the capacity qM of the hydraulic motor 82, it is possible to reduce the driving force.

The tire slip detection means 50 of the HST controller 48 detects the occurrence of tire slip based on the output shaft rotational speed of the hydraulic motor.

When the tire slip detection means 50 detects tire slip, the driving force measurement means 60 of the HST controller 48 measures the driving force F0 detected at the time of tire slip.

The present driving force F can be calculated based on the engine rotational speed, the hydraulic pump capacity qp, and the hydraulic motor 82 capacity qM, using mechanical transmission coefficients, such as the diameters of the transfer 84 and the tires 30, and so on as constants. Strictly, it is necessary to take into consideration leakages of hydraulic oil and hydraulic pressure losses in the hydraulic equipment.

When the driving force F0 is measured at the time that tire slip is detected as described above, the driving force control means 70 of the HST controller 48 controls the capacity variation means 40 as driving force variation means, so that the driving force F is less than the driving force F0 detected at the time of tire slip. Specifically, control is carried out so that the capacity qp of the hydraulic pump 81 is reduced, and if the slip disappears, the capacity qp of the hydraulic pump 81 is increased so that the optimum speed change ratio r is approached within the range that the driving force F is less than the driving force F0 detected at the time of tire slip. The hydraulic motor 82, or both of the hydraulic pump 81 and the hydraulic motor 82 may be controlled, rather than the hydraulic pump 81.

Also, the driving force F may be controlled by adjusting the pressure of the hydraulic oil flowing in the closed circuit 83.

On the assumption that the vehicle constitution as described above is employed, the first control, the second control, the third control, and the fourth control may be implemented by the controller 3.

Also, the first vehicle constitution example and the second vehicle constitution example were explained with speed change using the transmission 24 provided with a hydraulic clutch and the hydrostatic transmission (HST) 80, but these forms of transmission were examples, and transmissions in working vehicles that are a combination of hydraulic and mechanically driven or electrically driven are also known.

The present invention may be applied to all forms of transmission in the same way.

Also, in the above embodiments, the working vehicle was explained assuming a wheel loader, but the present invention may be applied in the same way to other working vehicles such as wheel type shovels, bulldozers, forklifts, and so on, provided that the working vehicle is provided with driving force variation means such as a modulation clutch or the like.

The scope of the claims is not limited by slip occurrence detection conditions and so on, or numerical values and so on used as examples in this specification document. For example, slip may be determined by measuring the speed of all the tires, and if any one tire has a faster speed compared with the others, slip may be determined. Also, to suppress the slip, the clutch may be fully disengaged, to reduce the driving force transmitted to the tires.

BRIEF DESCRIPTION OF THE DRAWINGS

FIG. 6 is a diagram for explaining the third control.

FIG. 7A shows an example of the variation of the driving force with time using the present invention during operation, FIG. 7B shows an example of the variation of the clutch pressure with time for the case that the driving force variation means is the modulation clutch, and FIG. 7C shows an example of the variation of the driving force with time using the conventional technique during operation, as a comparative example;

FIG. 8 is a diagram for explaining the first control.

FIG. 9A shows an example of the variation of the driving force with time using the present invention during operation, FIG. 9B shows an example of the variation of the clutch pressure with time for the case that the driving force variation means is the modulation clutch, and FIG. 9C shows an example of the variation of the driving force with time using the conventional technique during operation, as a comparative example;

Figure 1A:
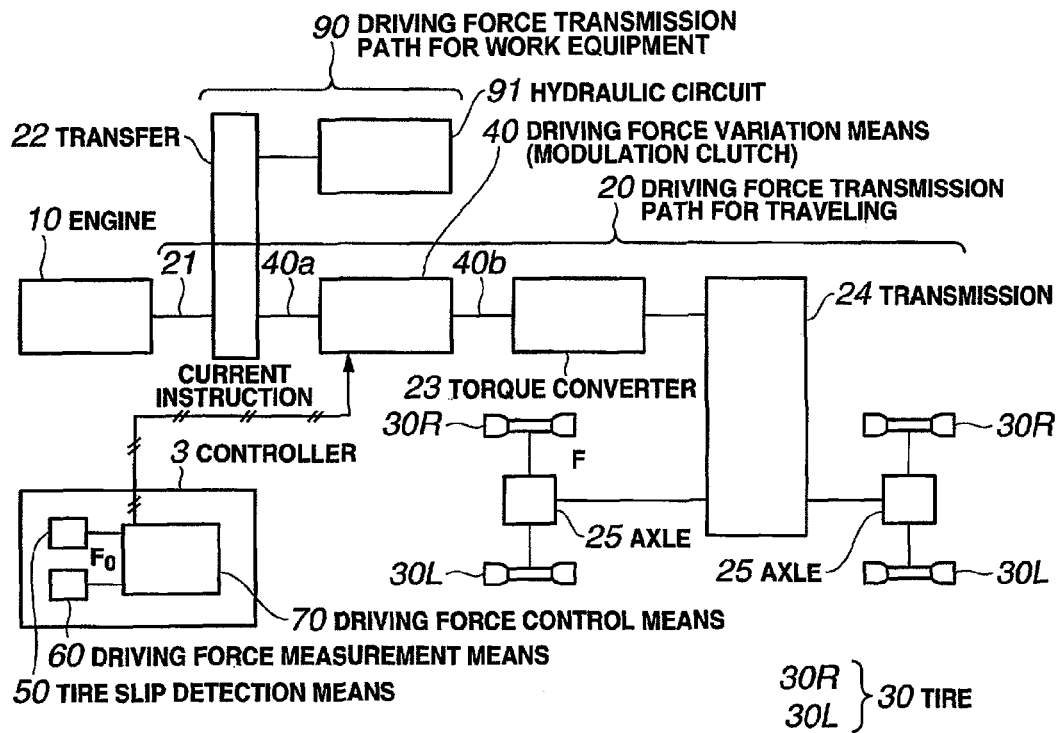
FIG. 1A is a block diagram showing the constitution of an embodiment of a working vehicle, indicating the parts according to the present invention for the constitution of a wheel loader.
Figure 1B:
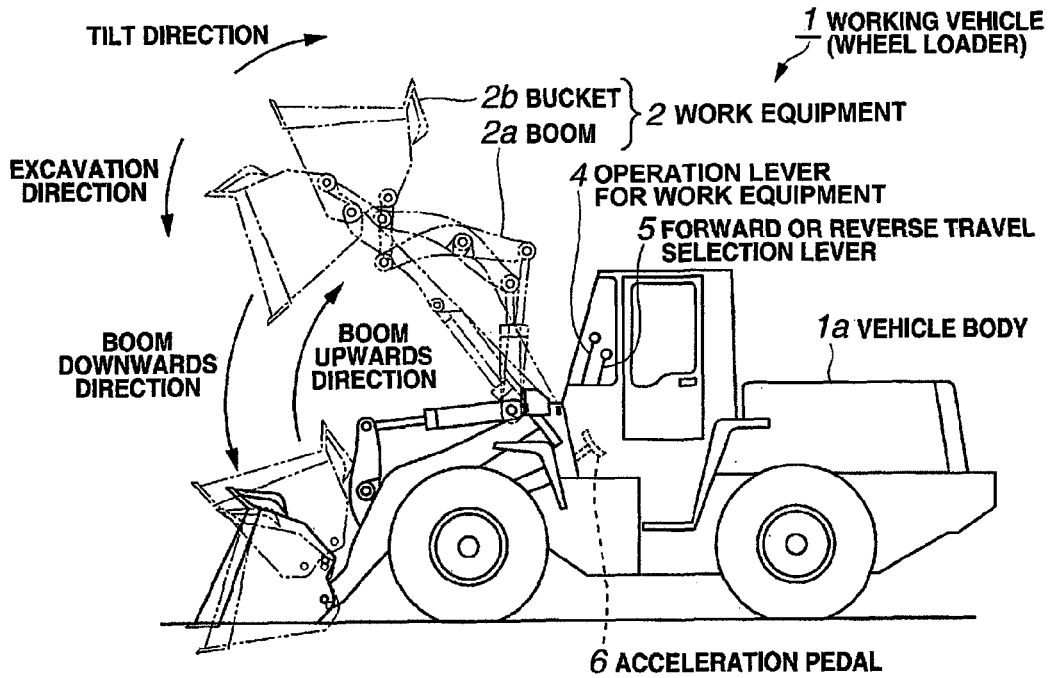
FIG. 1B is a diagram showing the external appearance of the working vehicle, indicating the parts according to the present invention in the external appearance of a wheel loader.
Figure 2A:
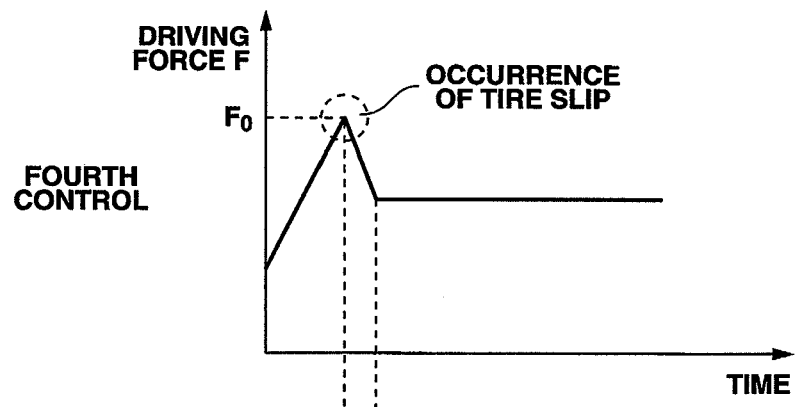
FIG. 2A shows an example of the variation of the driving force with time using the present invention, during operation.
Figure 2B:
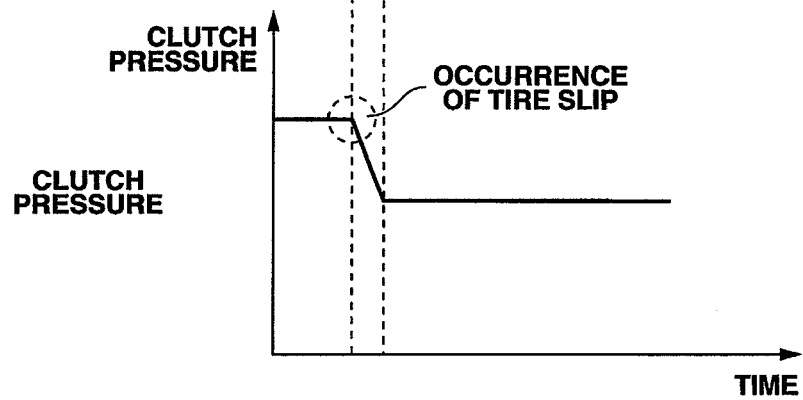
FIG. 2B shows an example of the variation of the clutch pressure with time for the case that the driving force variation means is the modulation clutch.
Figure 2C:
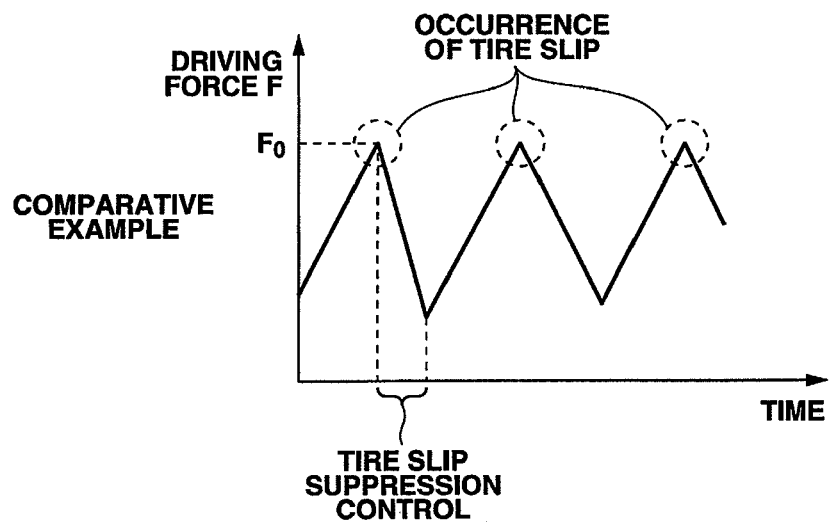
FIG. 2C shows an example of the variation of the driving force with time using the conventional technique during operation, as comparative example.
Figure 3A:
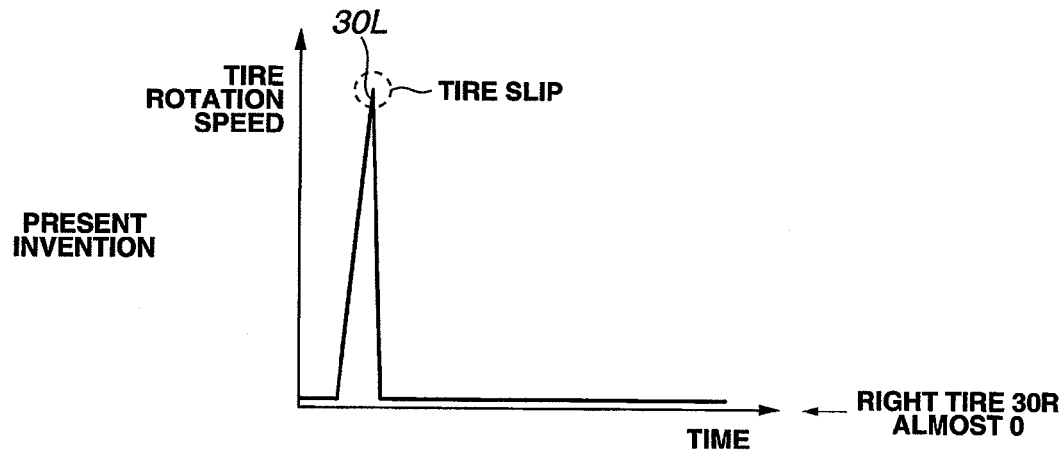
FIG. 3A shows an example of the variation of the rotational speed of the left and right tires using the present invention during operation.
Figure 3B:
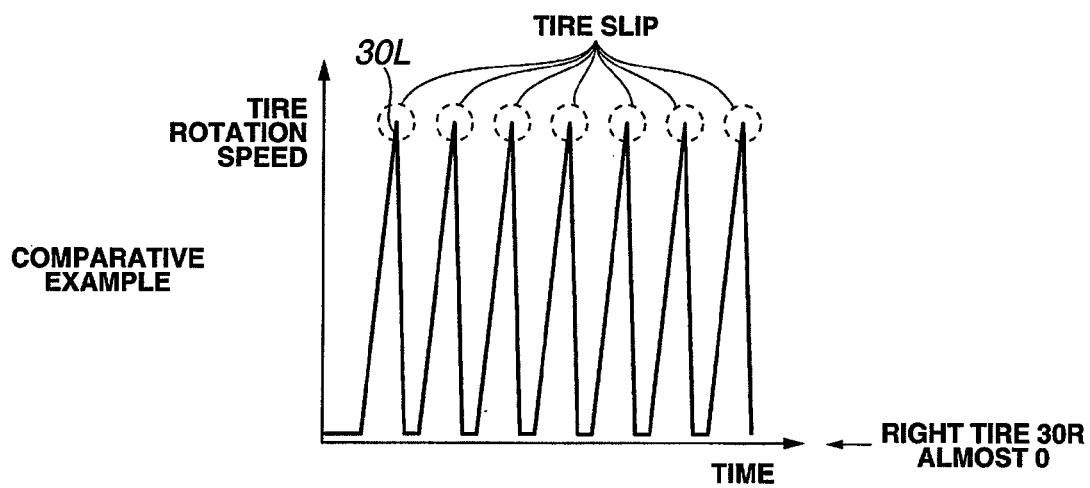
FIG. 3B shows an example of the variation of the rotational speed of the left and right tires with time using the conventional technique during operation, as a comparative example.
Figure 4:
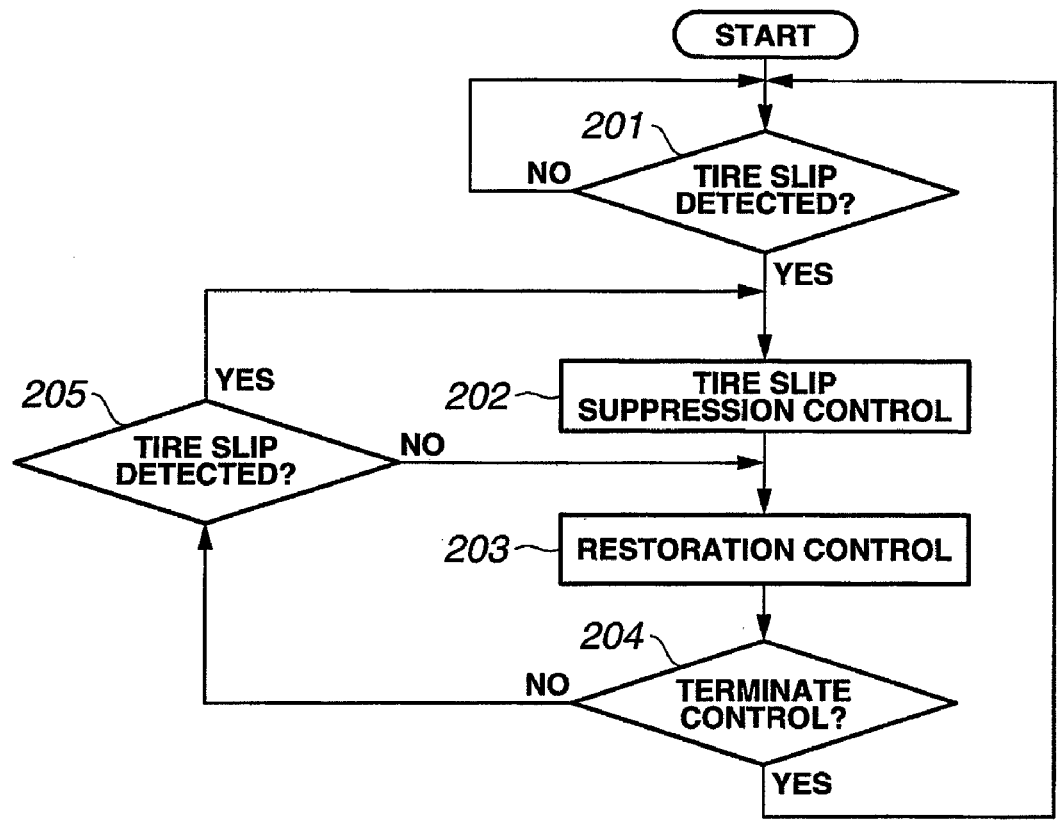
FIG. 4 is a diagram for explaining the second control, showing a flowchart of the procedure of the first tire slip prevention control.
Figure 5A:
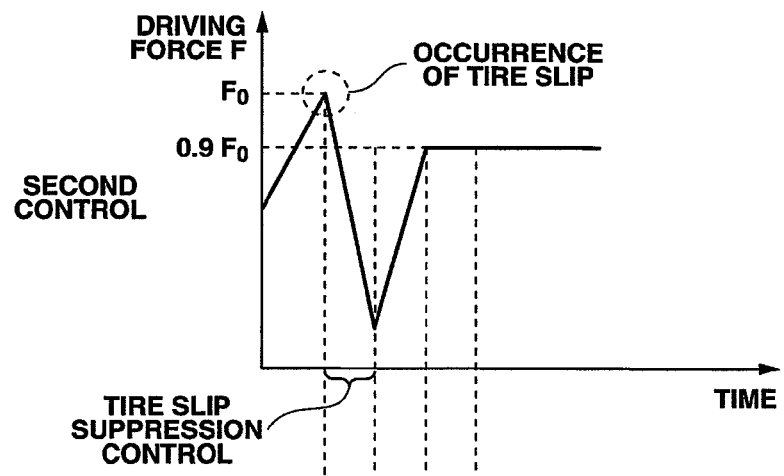
FIG. 5A shows an example of the variation of the driving force with time using the present invention during operation.
Figure 5B:
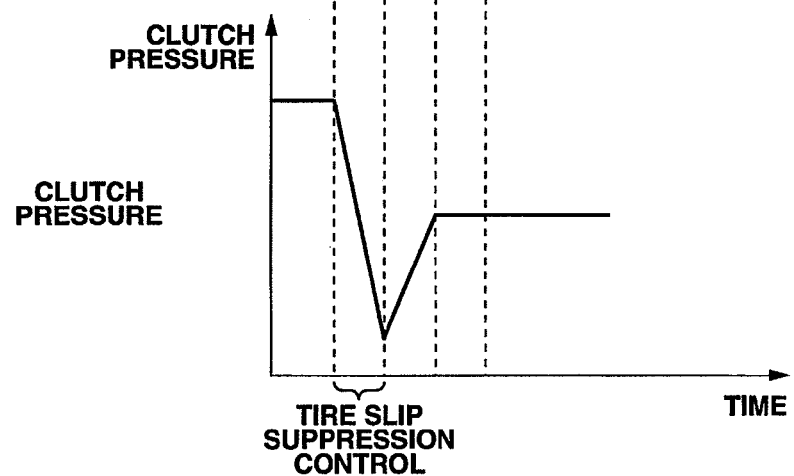
FIG. 5B shows an example of the variation of the clutch pressure with time for the case where the driving force variation means is the modulation clutch.
Figure 6A:
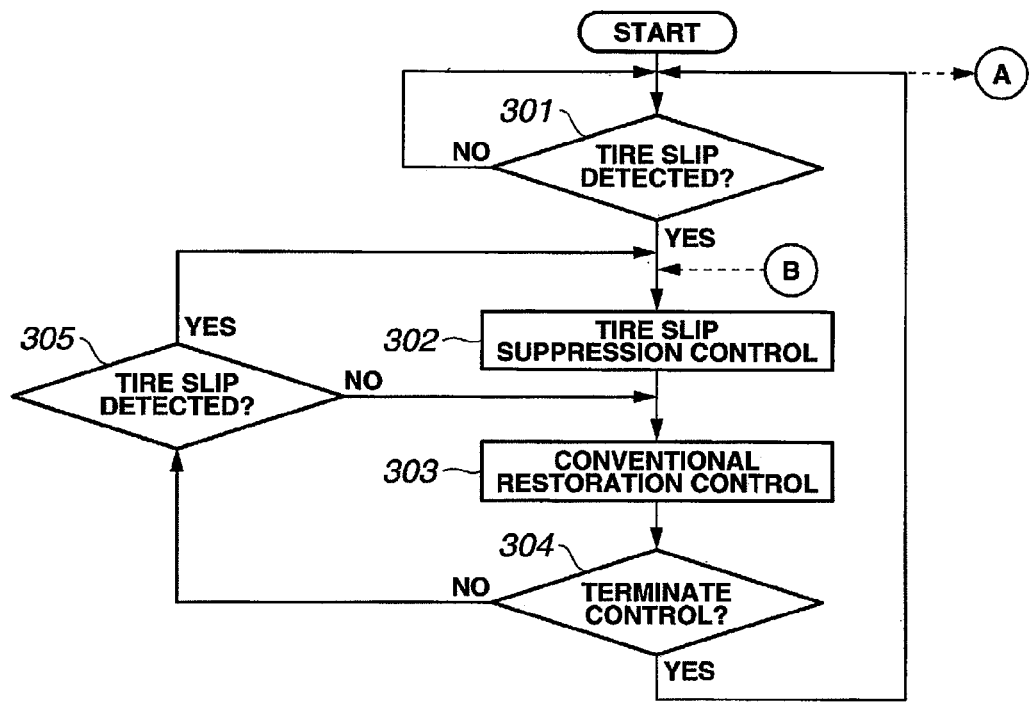
FIG. 6A is a flowchart showing the process procedure of the second tire slip prevention control.
Figure 6B:
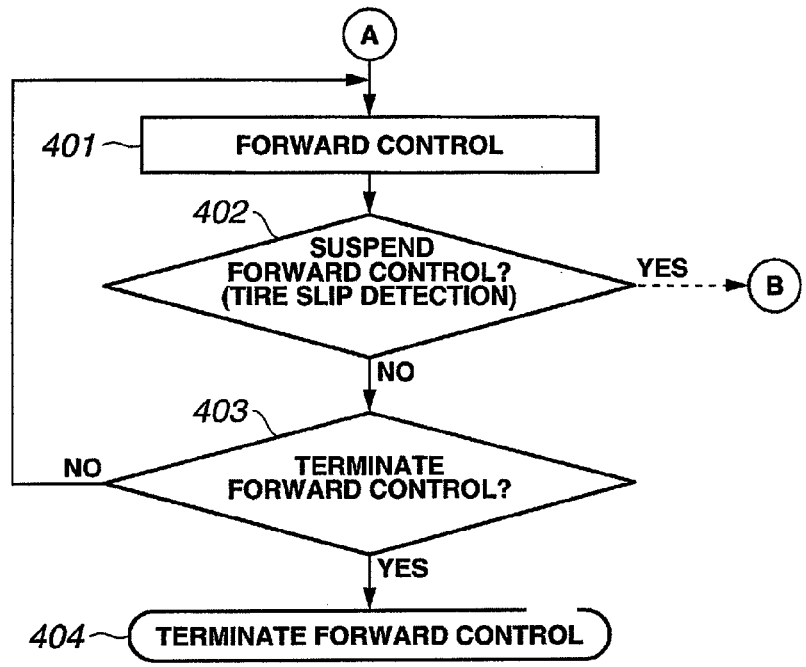
FIG. 6B is a flowchart showing the process procedure of the forward control.
Figure 8A:
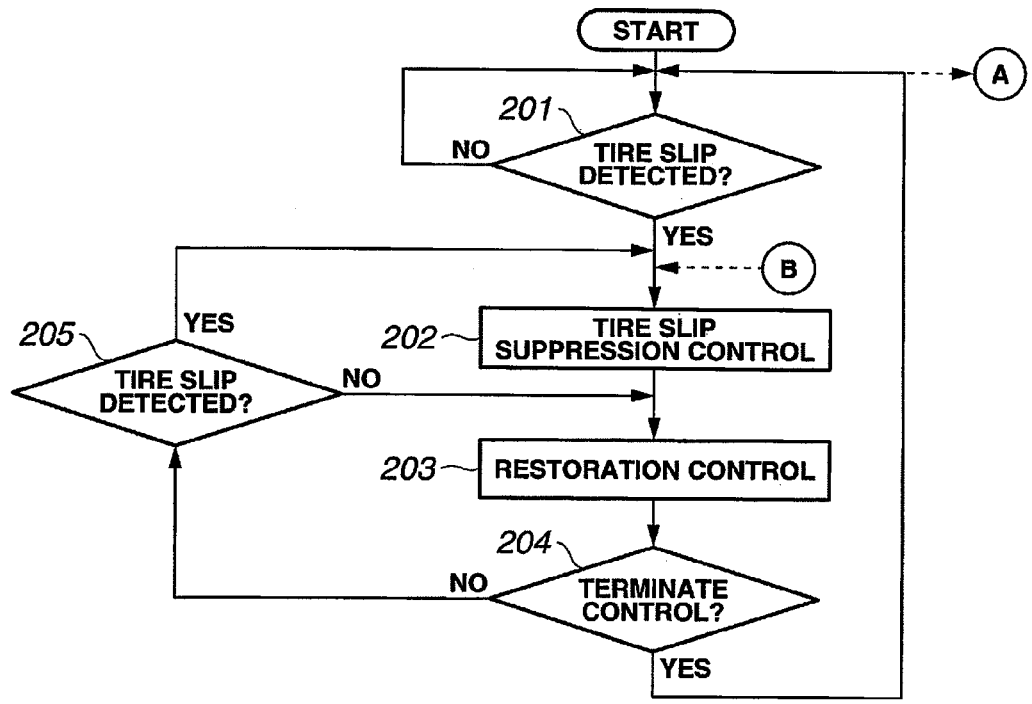
FIG. 8A is a flowchart showing the process procedure of the first tire slip prevention control.
Figure 8B:
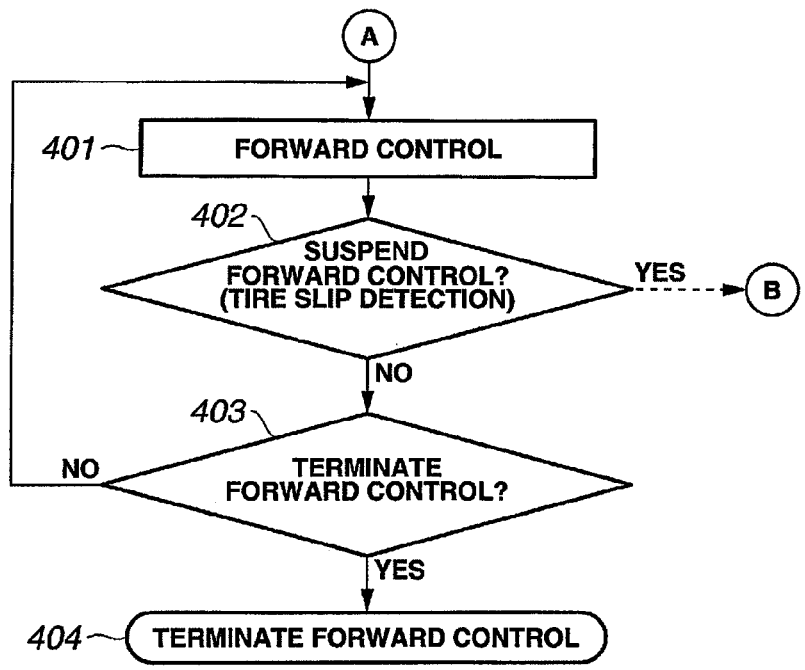
FIG. 8B is a flowchart showing the process procedure of the forward control.
Figure 10:
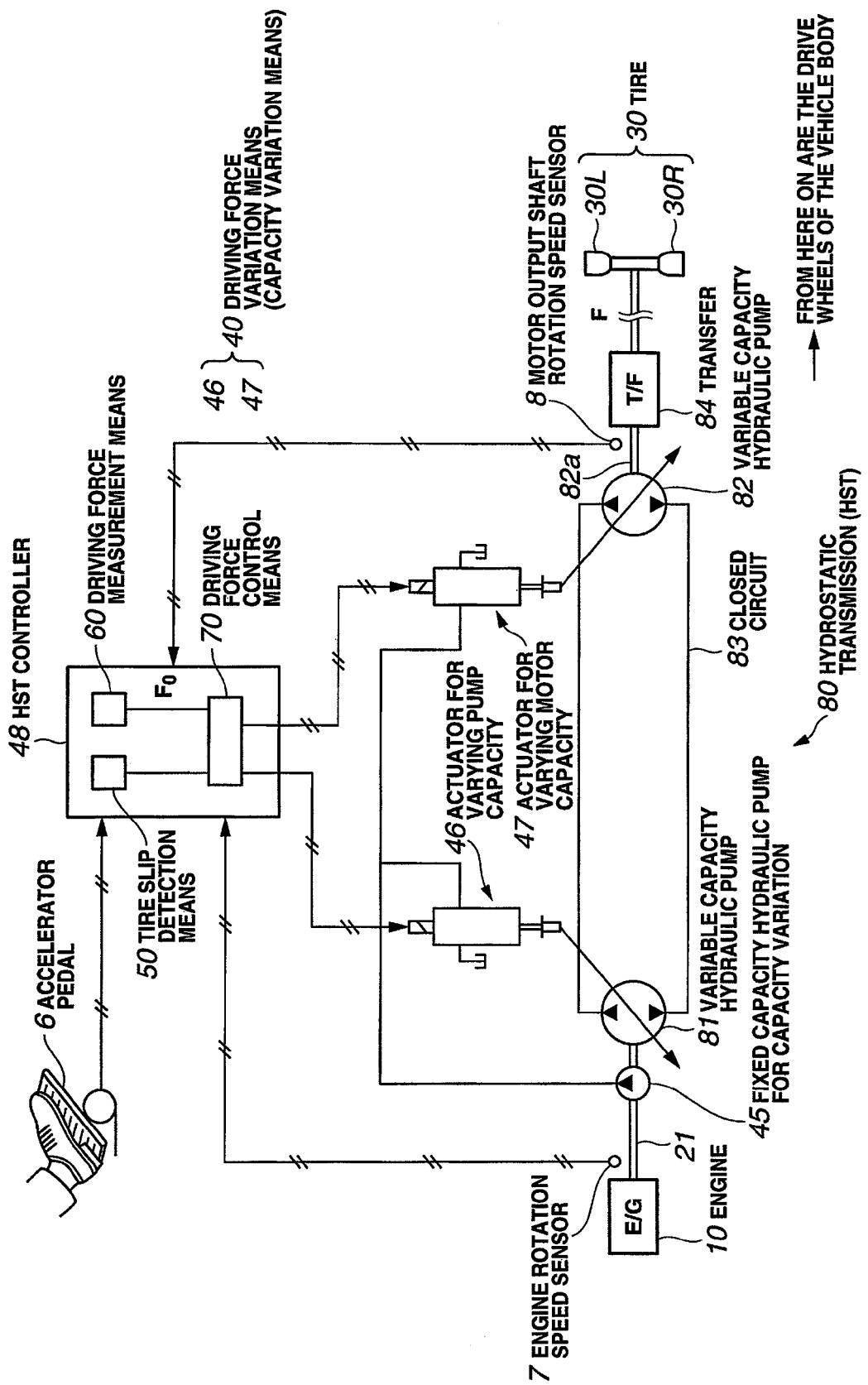
FIG. 10 is a constitution diagram of a working vehicle provided with a hydrostatic transmission.
Figure 11:
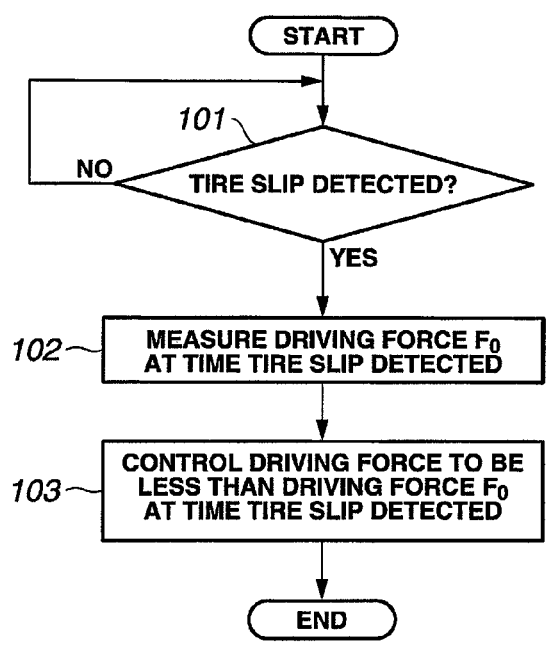
FIG. 11 is a diagram showing a flowchart of the fourth control.
Figure 12A:
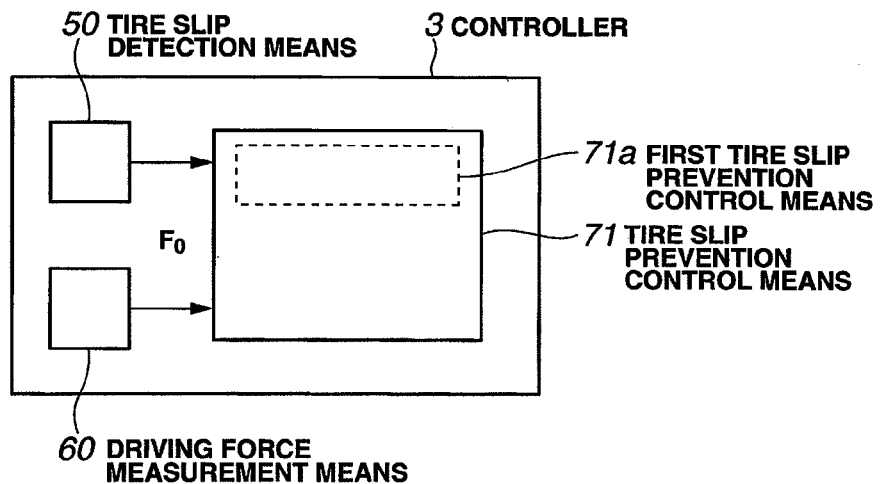
FIGS. 12A and 12B are diagrams showing the constitution of the controller.
Figure 12B:
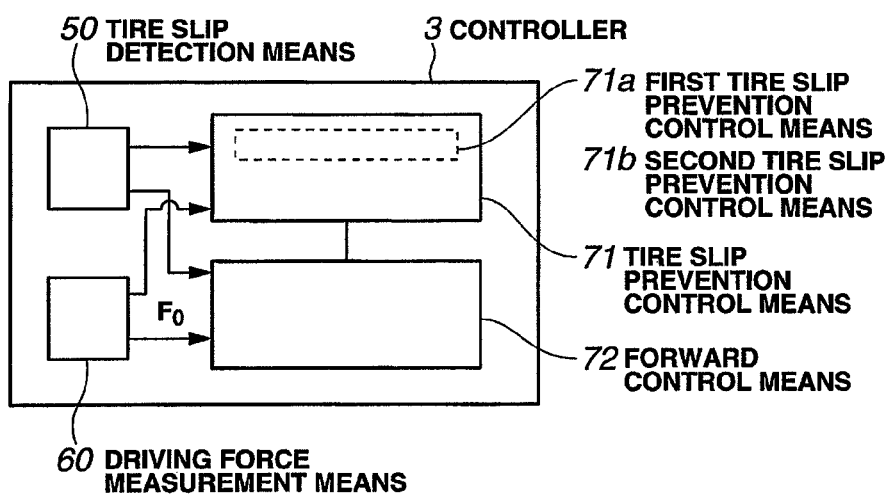
Figures 13A, 13B:
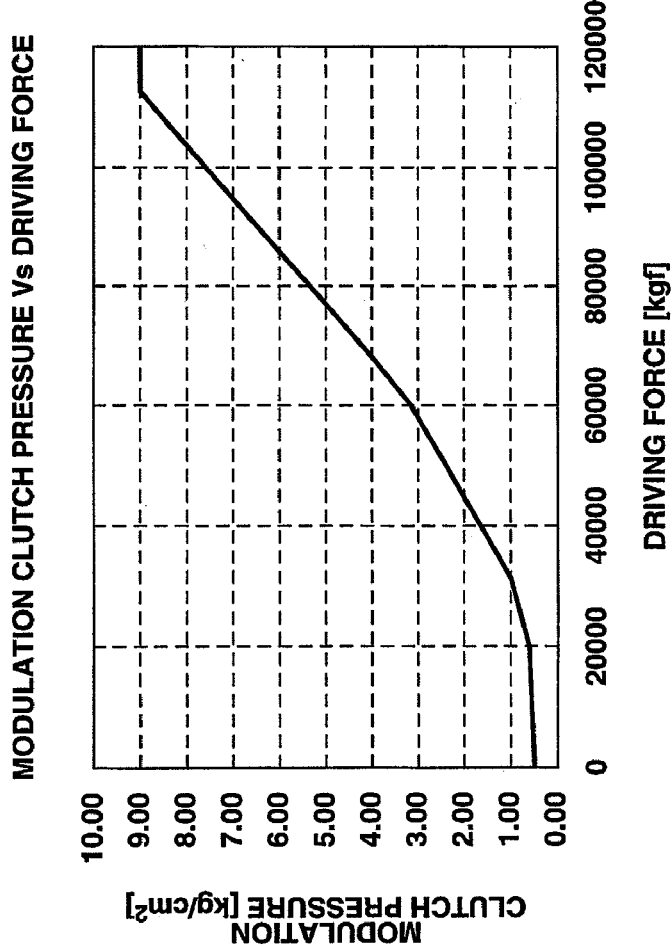
FIGS. 13A and 13B are diagrams showing an example of the correspondence relationship between the driving force and modulation clutch pressure corresponding to the driving force in table and graph forms.
Figures 14A, 14B:
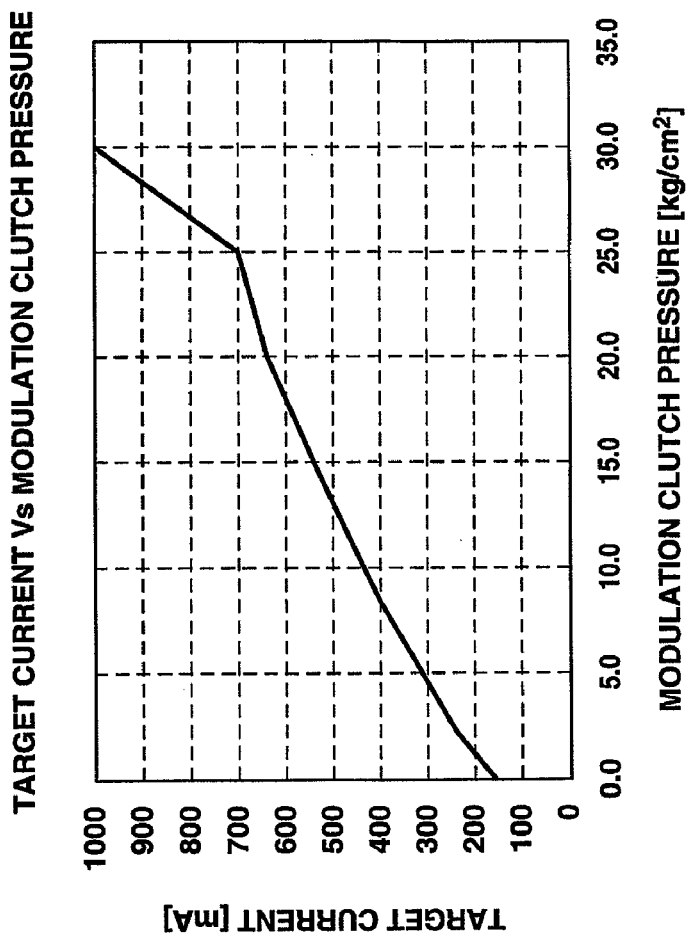
FIGS. 14A and 14B are diagrams showing an example of the correspondence relationship between the modulation clutch pressure and the target current in table and graph forms.
Figure 15:
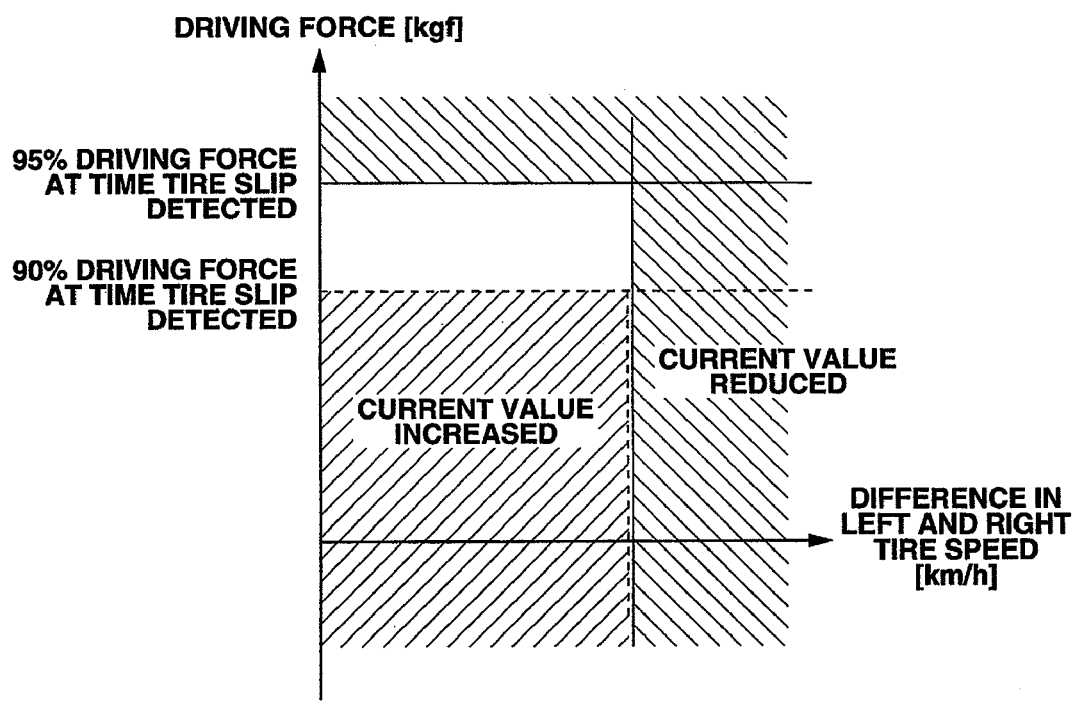
FIG. 15 is a diagram showing an example of a control map of the correspondence relationship between the speed difference of the left and right tires (horizontal axis), the present driving force (vertical axis), and the target current increase or decrease instruction (current instruction)
Figure 16:
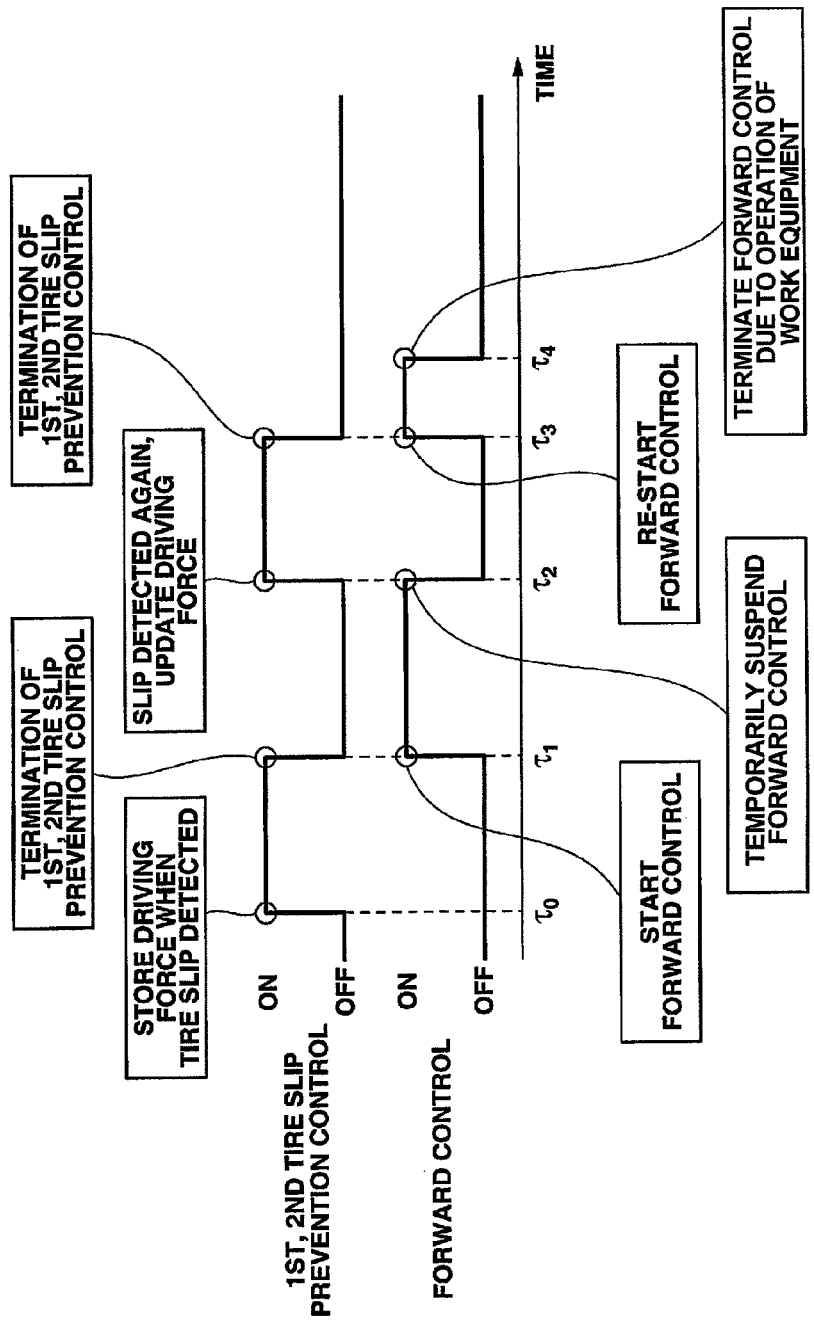
FIG. 16 is a diagram showing an example of the changes in the situation of the first and second tire slip prevention control and the forward control.

The invention claimed is:

1. A driving force control device of a working vehicle in which a work equipment is provided, and a power of an engine is transmitted to a tire as a driving force via a driving force transmission path, the device comprising:
   driving force variation means for freely varying the driving force transmitted to the tire, the driving force variation means being provided in the driving force transmission path;
   tire slip detection means for detecting an occurrence of a tire slip;
   driving force measurement means for measuring the driving force; and
   first tire slip prevention control means for controlling the driving force variation means such that,
   when the tire slip detection means detects the tire slip, the driving force measurement means measures the driving force at the time of the detection of the tire slip,
   after the tire slip is detected, the driving force is reduced to a first driving force which is lower than the measured driving force at the time of the detection of the tire slip to suppress the tire slip, and
   after the tire slip is suppressed, the driving force is restored to a second driving force which is within a range that is smaller than the measured driving force at the time of the detection of the tire slip and higher than the first driving force.

2. The driving force control device of a working vehicle according to claim 1, wherein
   the driving force variation means is a modulation clutch that can freely vary a degree of engagement of an input side and an output side, and
   the driving force control means or the tire slip prevention control means or the forward control means controls the degree of engagement of the modulation clutch such that the driving force becomes smaller than the driving force at the time of the detection of the tire slip.

3. The driving force control device of a working vehicle according to claim 1, wherein
   the driving force transmission path is provided with a hydrostatic transmission (HST) including a hydraulic pump connected to an output shaft of the engine, a hydraulic motor connected to the tire, and a closed circuit that links the hydraulic pump and the hydraulic motor,
   the driving force variation means is capacity variation means for freely varying a capacity of the hydraulic pump and/or the hydraulic motor of the hydrostatic transmission, and
   the driving force control means, the first or second tire slip prevention control means, or the forward control means controls the capacity variation means such that the driving force becomes smaller than the driving force at the time of the detection of the tire slip.

4. The driving force control device of a working vehicle according to claim 1, wherein the work equipment is a work equipment for excavation, and the control by the driving control means is carried out during excavation operation.

* * * * *